(12) United States Patent
Kim et al.

(10) Patent No.: US 12,645,609 B2
(45) Date of Patent: Jun. 2, 2026

(54) STORAGE DEVICE DELETING ENCRYPTION KEY, METHOD OF OPERATING THE SAME, AND METHOD OF OPERATING ELECTRONIC DEVICE INCLUDING THE SAME

(71) Applicant: Samsung Electronics Co., Ltd., Suwon-si (KR)

(72) Inventors: Changhwan Kim, Suwon-si (KR); Mingon Shin, Suwon-si (KR); Jisoo Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 339 days.

(21) Appl. No.: 18/356,295

(22) Filed: Jul. 21, 2023

(65) Prior Publication Data

US 2024/0086336 A1 Mar. 14, 2024

(30) Foreign Application Priority Data

Sep. 14, 2022 (KR) ........................ 10-2022-0115876
Mar. 8, 2023 (KR) ........................ 10-2023-0030721

(51) Int. Cl.
*G06F 12/14* (2006.01)
*G06F 1/30* (2006.01)
*G06F 13/16* (2006.01)

(52) U.S. Cl.
CPC ............ *G06F 12/1408* (2013.01); *G06F 1/30* (2013.01); *G06F 12/1441* (2013.01); *G06F 13/1668* (2013.01)

(58) Field of Classification Search
CPC .... G06F 12/1408; G06F 12/1441; G06F 1/30; G06F 13/1668
See application file for complete search history.

(56) References Cited

U.S. PATENT DOCUMENTS

| | | | |
|---|---|---|---|
| 7,581,118 B2 | 8/2009 | McGovern | |
| 8,250,380 B2 | 8/2012 | Guyot et al. | |
| 8,938,624 B2 | 1/2015 | Obukhov et al. | |
| 9,311,237 B2 | 4/2016 | Little et al. | |
| 2009/0276514 A1* | 11/2009 | Subramanian ...... | G06F 21/6218 713/193 |
| 2010/0217977 A1 | 8/2010 | Goodwill et al. | |
| 2014/0068277 A1 | 3/2014 | Metzger | |

(Continued)

FOREIGN PATENT DOCUMENTS

KR 10-0591117 B1 6/2006

*Primary Examiner* — Matthew T Henning
(74) *Attorney, Agent, or Firm* — Harness, Dickey & Pierce, P.L.C.

(57) ABSTRACT

A method of operating a storage device which communicates with a host device. The method including allocating a secure region and a user region, storing first data encrypted by using a first encryption key in a first data block of the secure region, receiving a first request indicating a first secure delete operation of the first data from the host device, decrypting at least one valid data of the first data block by using the first encryption key based on the first request, wherein the at least one valid data do not include the first data, encrypting the decrypted at least one valid data by using a second encryption key different from the first encryption key, storing the encrypted at least one valid data in a second data block of the secure region, and deleting the first encryption key.

19 Claims, 16 Drawing Sheets

(56) References Cited

U.S. PATENT DOCUMENTS

| | | | | |
|---|---|---|---|---|
| 2017/0185336 A1* | 6/2017 | Byun | .................... | G06F 3/0625 |
| 2020/0004993 A1* | 1/2020 | Volos | .................... | G06F 21/805 |
| 2021/0405907 A1 | 12/2021 | Nagai | | |
| 2022/0164487 A1 | 5/2022 | Gyllenskog et al. | | |
| 2022/0283714 A1 | 9/2022 | Lee et al. | | |

* cited by examiner

Figure 2:
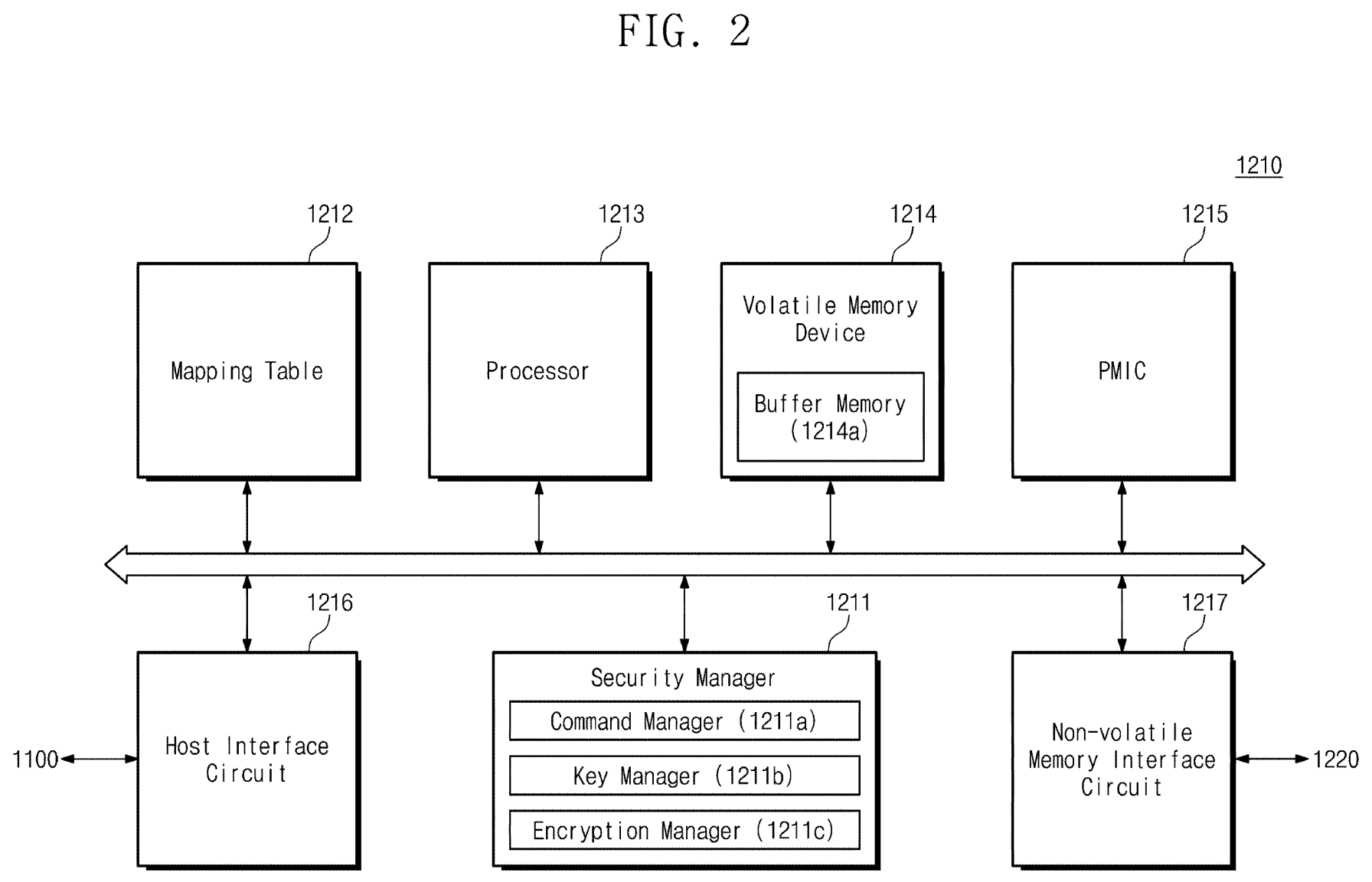

1215 — PMIC

1214 — Volatile Memory Device

Buffer Memory (1214a)

1213 — Processor

1212 — Mapping Table

1217 — Non-volatile Memory Interface Circuit

1220

1211 — Security Manager

Command Manager (1211a)

Key Manager (1211b)

Encryption Manager (1211c)

1216 — Host Interface Circuit

Figure 14:
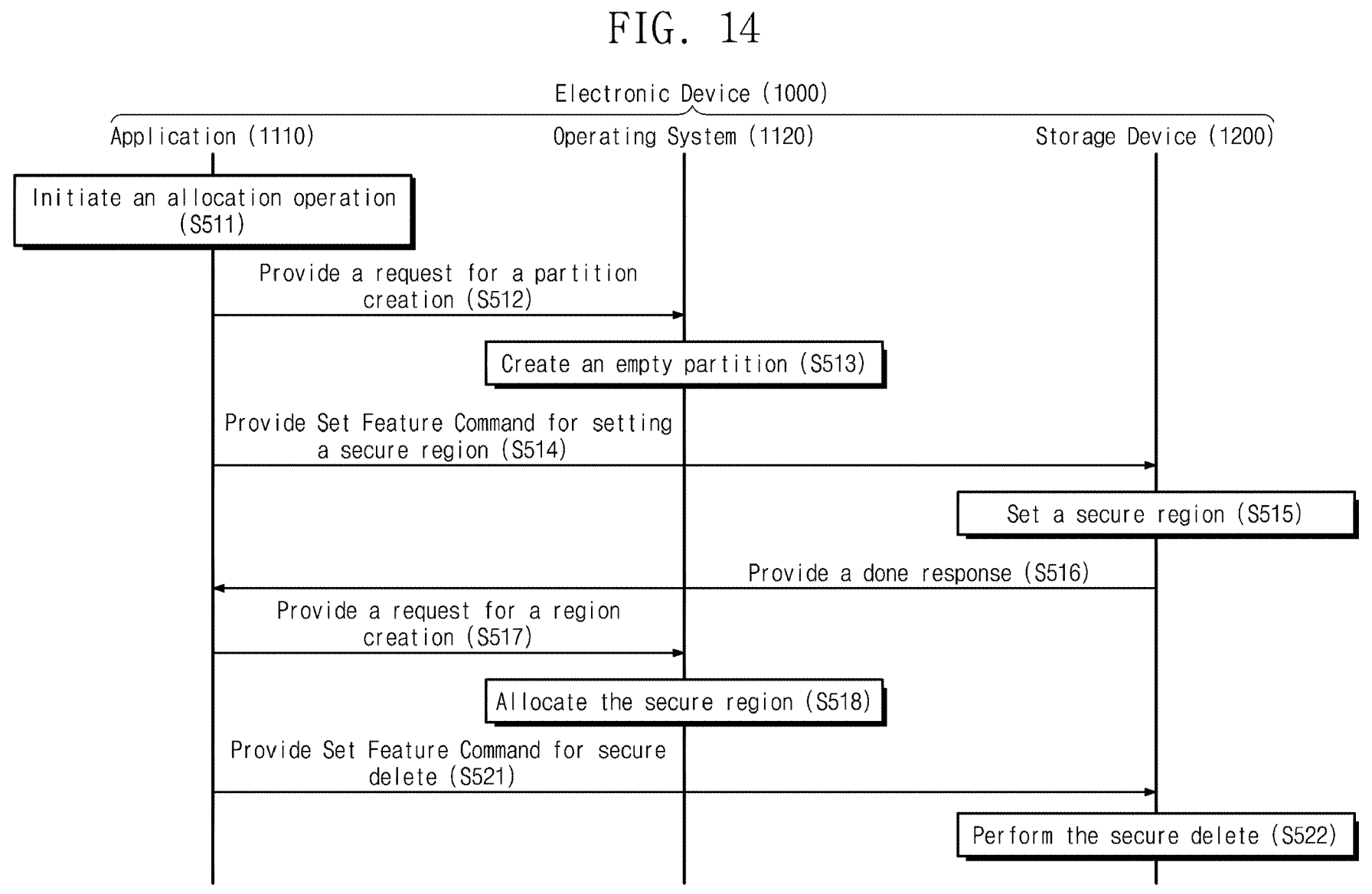

Electronic Device (1000)

Application (1110)

Operating System (1120)

Storage Device (1200)

Initiate an allocation operation (S511)

Provide a request for a partition creation (S512)

Create an empty partition (S513)

Provide Set Feature Command for setting a secure region (S514)

Set a secure region (S515)

Provide a done response (S516)

Provide a request for a region creation (S517)

Allocate the secure region (S518)

Provide Set Feature Command for secure delete (S521)

Perform the secure delete (S522)

Set Feature Command

| Bits | Description |
|------|-------------|
| 31 | Save : This bit specifies that the controller shall save the attribute so that the attribute persists through all power states and resets |
| 30:08 | Reserved |
| 07:00 | Feature Identifier : This field indicates the identifier of the Feature that attributes are being specified for |

Feature Identifier

| Bits (Hexadecimal) | Description |
|--------------------|-------------|
| 00h | Reserved |
| 01h to 18h | Defined in the NVMe specification |
| 19h to 77h | Reserved |
| 78h to 7Fh | Refer to the NVMe Management Interface Specification for definition |
| 80h to BFh | Command Set Specific (Reserved) |
| C0h to FFh | Vender Specific<br>-'CreateSecurePartiion' is defined herein<br>-'TriggerSecureMigration' is defined herein |

FIG. 15

STORAGE DEVICE DELETING ENCRYPTION KEY, METHOD OF OPERATING THE SAME, AND METHOD OF OPERATING ELECTRONIC DEVICE INCLUDING THE SAME

CROSS-REFERENCE TO RELATED APPLICATIONS

This application claims priority under 35 U.S.C. § 119 to Korean Patent Application Nos. 10-2022-0115876 filed on Sep. 14, 2022, and 10-2023-0030721 filed on Mar. 8, 2023, in the Korean Intellectual Property Office, the disclosures of each of which are incorporated by reference herein in their entireties.

BACKGROUND

Embodiments of the present disclosure described herein relate to a storage device, and more particularly, relate to a storage device deleting an encryption key, a method of operating the same, and a method of operating an electronic device including the storage device.

A memory device stores data in response to a write request and outputs data stored therein in response to a read request. For example, the memory device is classified as a volatile memory device, which loses data stored therein when a power is turned off, such as a dynamic random access memory (DRAM) device or a static RAM (SRAM) device, or a non-volatile memory device, which retains data stored therein even when a power is turned off, such as a flash memory device, a phase-change RAM (PRAM), a magnetic RAM (MRAM), or a resistive RAM (RRAM).

The memory device may store data received from a host device. The host device may identify data by using a logical address. The memory device may generate a mapping relationship between a logical address and a physical address and may store data in memory cells corresponding to the physical address. The host device may provide the memory device with a request for deleting data. Even though the memory device deletes the mapping relationship, the data stored in the memory cells may not be physically erased. The data that are not physically erased may then be retrieved and/or accessed by a malicious user. Accordingly, there is required a technique for guaranteeing security of a delete operation.

SUMMARY

Embodiments of the present disclosure provide a storage device deleting an encryption key, a method of operating the same, and a method of operating an electronic device including the storage device.

According to at least one embodiment, a storage device which communicates with a host device. A method of operating the storage device includes allocating a secure region and a user region in the storage device; storing first data encrypted by using a first encryption key in a first data block of the secure region; decrypting at least one valid data of the first data block using the first encryption key in response to receiving a first request from the host device, wherein the first request indicates a first secure delete operation of the first data and the at least one valid data does not include the first data; encrypting the decrypted at least one valid data using a second encryption key, wherein the second encryption key is different from the first encryption key; storing the encrypted at least one valid data in a second data block of the secure region; and deleting the first encryption key.

According to at least one embodiment, an electronic device includes a host device and a storage device. A method of operating the electronic device includes providing, by the host device, a first request for allocation of the storage device; allocating, by the storage device, a secure region and a user region in response to the first request; providing, by the host device, a second request for a secure write operation of target data; storing, by the storage device, first data encrypted by using a first encryption key in a first data block of the secure region in response to the second request; providing, by the host device, a third request indicating a secure delete operation of the target data; decrypting, by the storage device, at least one valid data of the first data block using the first encryption key in response to the third request, wherein the at least one valid data does not include the target data; encrypting, by the storage device, the decrypted at least one valid data using a second encryption key different from the first encryption key; storing, by the storage device, the encrypted at least one valid data in a second data block of the secure region; and deleting, by the storage device, the first encryption key.

According to at least one embodiment, a storage device includes a non-volatile memory device including a user region and a secure region, and a storage controller communicating with a host device and the non-volatile memory device. The storage controller stores target data encrypted using a first encryption key in a first data block of the secure region in response to receiving a first request from the host device, wherein the first request indicates a secure write operation; decrypts at least one valid data of the first data block using the first encryption key in response to receiving a second request from the host device, wherein the second request indicates a secure delete operation and the at least one valid data does not include the first data; encrypts the decrypted at least one valid data using a second encryption key, wherein the second encryption key is different from the first encryption key; stores the encrypted at least one valid data in a second data block of the secure region; and delete the first encryption key.

BRIEF DESCRIPTION OF THE FIGURES

The above and other objects and features of the present disclosure will become apparent by describing in detail embodiments thereof with reference to the accompanying drawings.

FIG. 2 is a block diagram illustrating a storage controller of FIG. 1, according to some embodiments of the present disclosure.

FIG. 11 is a diagram describing a secure delete operation resumed after a sudden power off (SPO) event, according to some embodiments of the present disclosure.

FIG. 13 is a flowchart describing a method of operating an electronic device according to some embodiments of the present disclosure.

FIG. 14 is a flowchart describing a method of operating an electronic device according to some embodiments of the present disclosure.

FIG. 15 is a diagram describing a command of an electronic device according to some embodiments of the present disclosure.

DETAILED DESCRIPTION

Figure 1:
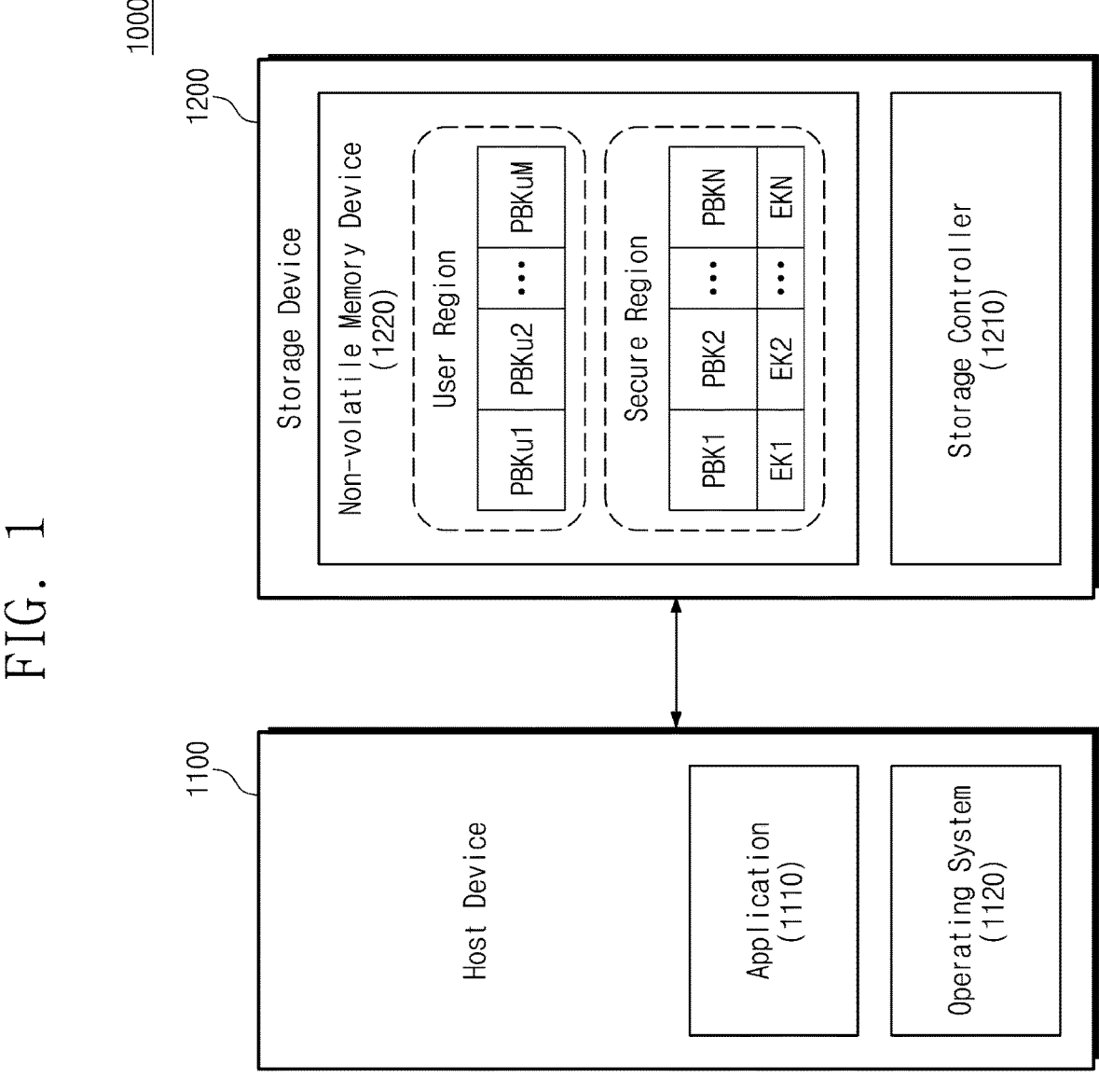
FIG. 1 is a block diagram of an electronic device according to at least one embodiment of the present disclosure.

Below, embodiments of the present disclosure will be described in detail and clearly to such an extent that one skilled in the art carries out embodiments of the present disclosure easily. Examples of some embodiments are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects.

Functional components, including those described in the detailed description with reference to terms "unit", "module", "layer", "device", "controller", etc., and function blocks illustrated in drawings may be implemented in the form of processing circuitry, such as software, hardware, or a combination thereof, unless expressly indicated otherwise. For example, the processing circuitry more specifically may include, but is not limited to, electronic circuits including electrical components such as at least one of transistors, resistors, capacitors, etc., a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

It will be understood that, although the terms "first," "second," and/or "third" may be used herein to describe various elements, operations, and/or the like, these elements, operations, etc., should not be limited by these terms. These terms are only used to distinguish one element, operation, etc. from another element, operation, etc. Thus, a first element, operation, request, etc., discussed below could be alternatively termed a second, third, etc. element, operation, request, etc., without departing from the present disclosure.

FIG. 1 is a block diagram of an electronic device according to at least one embodiment of the present disclosure. Referring to FIG. 1, an electronic device 1000 includes a host device 1100 and a storage device 1200. The electronic device 1000 may be a computing system, which is configured to process and/or store a variety of information, such as a personal computer (PC), a notebook, a laptop, a server, a workstation, a tablet PC, a smartphone, a digital camera, a black box, and/or the like.

The host device 1100 is configured to control an overall operation of the electronic device 1000. The host device 1100 may communicate with the storage device 1200. For example, the host device 1100 may communicate with the storage device 1200 to store data in the storage device 1200, read data stored in the storage device 1200, and/or delete data stored in the storage device 1200. In some embodiments, the host device 1100 and the storage device 1200 may communicate with each other in compliance with the NVMe (Non-Volatile Memory Express) standard.

In at least one embodiment, the host device 1100 includes an application 1110 and an operating system 1120. In at least one embodiment, the application 1110 and the operating system 1120 may be implemented by software. For example, the host device 1100 may include a processor and a memory. At least some of functions that are implemented by software may be stored in a non-transitory computer-readable medium (e.g., the storage device 1200) as an instruction. The processor of the host device 1100 may be configured to execute the instructions such that the host device 1100 performs functions corresponding to instructions by loading the instructions stored in the non-transitory computer-readable medium to the memory of the host device 1100 and executing the loaded instructions.

The application 1110 may initiate a system operation under control of the user. For example, the application 1110 may generate a file, may read the generated file, may edit the generated file, and/or may delete the generated file. The file may be stored in the storage device 1200 as data.

The operating system 1120 may be a system that provides an interface between the software and the hardware and manages at least one resource of the electronic device 1000. Depending on a system request of the application 1110, the operating system 1120 may provide a command and an address to the storage device 1200 and may communicate with the storage device 1200.

According to at least one embodiment, the storage device 1200 includes a storage controller 1210 and a non-volatile memory device 1220. Depending on a request of the host device 1100, the storage controller 1210 may store data in the non-volatile memory device 1220 and/or may read data stored in the non-volatile memory device 1220. The non-volatile memory device 1220 may operate under control of the storage controller 1210. For example, based on the command and the address received from the host device 1100, the storage controller 1210 may store data in the non-volatile memory device 1220 or may read data stored in the non-volatile memory device 1220.

In some embodiments, the storage controller 1210 may support a secure operation. For example, the storage controller 1210 may receive a secure write request from the host device 1100 and store data encrypted using an encryption key in the non-volatile memory device 1220. As another example, the storage controller 1210 may receive a secure read request from the host device 1100, decrypt the data of the non-volatile memory device 1220 by using the encryption key, and provide the decrypted data to the host device 1100. The encryption key may include a series of unique codes that are used in the encryption operation and the decryption operation.

The content of the encrypted data may be difficult for a user (and/or the application 1110) to discern without decryption. For example, if the encrypted data is leaked out to a malicious user through an abnormal access path, the content of the encrypted data may be difficult to discern for the malicious user. The decryption operation that uses a relevant encryption key may be required to discern the content of the encrypted data. That is, the secure operation may prevent the content of the stored data from being leaked out. A secure region may be appropriate for storing data requiring security (e.g., personal information or sensitive information of a user).

The non-volatile memory device 1220 is configured to store data. In some embodiments, the non-volatile memory device 1220 may be a NAND flash memory device, but the present disclosure is not limited thereto. For example, the non-volatile memory device 1220 may be one of various storage devices, which retain data stored therein even though a power is turned off, such as a phase-change random access memory (PRAM), a magnetic random access memory (MRAM), a resistive random access memory (RRAM), a ferroelectric random access memory (FRAM), and/or the like.

The non-volatile memory device 1220 may include a user region and a secure region. The secure region may refer to a region that is managed in compliance with a security policy of the present disclosure. For example, the secure region may refer to a region that stores the encrypted data in compliance with the security policy of the present disclosure. The secure region may include a plurality of data blocks PBK1 to PBKN. Herein, "N" is a natural number. Each of the plurality of data blocks PBK1 to PBKN may include a physical data block including a plurality of pages. A page may refer to a minimum unit by which data (e.g., a data chunk) identified by a physical address are stored. For example, a page may refer to a minimum unit of the write operation. A physical data block may refer to a minimum unit of the erase operation.

The plurality of data blocks PBK1 to PBKN are configured to store data that are encrypted by using a plurality of encryption keys EK1 to EKN. For example, the first data block PBK1 may store data encrypted by using the first encryption key EK1. The decryption operation using the first encryption key EK1 may be required to read the data of the first data block PBK1. The second data block PBK2 may store data encrypted by the second encryption key EK2. The decryption operation using the second encryption key EK2 may be required to read the data of the second data block PBK2. The plurality of encryption keys EK1 to EKN may be managed by the storage controller 1210.

For better understanding of the present disclosure, the description will be given as the plurality of encryption keys EK1 to EKN are different from each other, but the present disclosure is not limited thereto. An encryption key of the same content may be used at the same time point; however, a new encryption key may be added over time, and/or a plurality of encryption keys may exist at the same time point in compliance with a management policy.

For example, when the first data block PBK1 and the second data block PBK2 store data corresponding to files generated at the same time point, the content of the first encryption key EK1 may be identical to the content of the second encryption key EK2. Afterward, when the third data block PBK3 stores data corresponding to another file, the content of the third encryption key EK3 may be different from the content of the first encryption key EK1 and the content of the second encryption key EK2. In this case, the first encryption key EK1 and the second encryption key EK2 may be referred to as an "old key", and the third encryption key EK3 may be referred to as a "new key".

The user region may refer to a region that is managed independently of the security policy of the present disclosure. For example, the user region may be used to manage data that are not encrypted in compliance with the security policy of the present disclosure or are encrypted in compliance with any other policy (e.g., an SED (Self-Encrypt Device) standard). The user region may be referred to as a "non-management region" for data independent of the security policy of the present disclosure.

The user region may include a plurality of user data blocks PBKu1 to PBKuM. Herein, "M" is a natural number. Each of the plurality of user data blocks PBKu1 to PBKuM may include a physical data block including a plurality of pages. Each of the plurality of user data blocks PBKu1 to PBKuM may store data not encrypted (e.g., normal data) or data encrypted in compliance with a policy different from the security policy of the present disclosure.

Because the data of the user region are managed without encryption and decryption complying with the security policy of the present disclosure, the read and write operations in the user region may be faster than the read and write operations in the security policy, and power consumption in the user region may be smaller than power consumption in the security policy. The user region may be appropriate for storing data that have a low important level and require a fast read operation and a fast write operation.

In some embodiments, the storage controller 1210 may adjust a ratio of the user region and the secure region of the non-volatile memory device 1220. For example, the non-volatile memory device 1220 may include a plurality of physical data blocks. The storage controller 1210 may determine the ratio of the user region and the secure region depending on a request of the host device 1100. Depending on the determined ratio, the storage controller 1210 may use some of the plurality of physical data blocks as the plurality of data blocks PBK1 to PBKN and may use the others of the plurality of physical data blocks as the plurality of user data blocks PBKu1 to PBKuM. The ratio of the user region and the secure region may be again adjusted depending on a next request of the host device 1100.

As described above, according to at least one embodiment of the present disclosure, the storage device 1200 may store the encrypted data in the secure region, and thus, the security of the stored data may be improved. Also, because the storage device 1200 supports both the user region and the secure region, the user (and/or storage controller 1210) may selectively manage data in terms of security, latency, and power, and the convenience of the user may be increased.

FIG. 2 is a block diagram illustrating a storage controller of FIG. 1, according to some embodiments of the present disclosure. Referring to FIG. 2, the storage controller 1210 includes a security manager 1211, a mapping table 1212, a processor 1213, a volatile memory device 1214, a power management integrated circuit (PMIC) 1215, a host interface circuit 1216, and a non-volatile memory interface circuit 1217.

The security manager 1211 is configured to perform the secure operation based on a request from the host device 1100. The security manager 1211 may be implemented with processing circuitry, such as hardware, software, or a combination of hardware and software. In some embodiments, at least part of the security manager 1211 may be implemented with hardware on a flash translation layer (FTL).

According to at least one example, at least part of the security manager 1211 may be implemented by software. In this case, the security manager 1211 may be stored in the non-volatile memory device 1220 in the form of an instruction. As the processor 1213 loads instructions from the non-volatile memory device 1220 to the volatile memory device 1214 and executes the loaded instructions, the functions of the security manager 1211 may be implemented.

The security manager 1211 may include a command manager 1211*a*, a key manager 1211*b*, and an encryption manager 1211*c*. The command manager 1211*a* is configured to process the request from the host device 1100. The command manager 1211*a* may allocate the secure region and the user region depending on the request of the host device 1100. The command manager 1211*a* may manage (e.g., write, read, or delete) data of the user region and the secure region based on the request of the host device 1100.

The key manager 1211*b* is configured to manage an encryption key. As a time elapses, the key manager 1211*b* may generate a new encryption key and/or may discard (e.g., delete) a previously generated encryption key. The key manager 1211*b* may manage a plurality of encryption keys respectively allocated to a plurality of data blocks in the secure region of the non-volatile memory device 1220. The key manager 1211*b* may provide an encryption key to the encryption manager 1211*c* under control of the command manager 1211*a*.

Under control of the command manager 1211*a*, the encryption manager 1211*c* may perform data encryption or data decryption by using the encryption key received from the key manager 1211*b*.

The security manager 1211 is configured to perform a secure write operation. For example, based on the secure write request from the host device 1100, the command manager 1211*a* may buffer (e.g., temporarily store) data received from the host device 1100 in a buffer memory 1214*a* of the volatile memory device 1214, may control the key manager 1211*b* and the encryption manager 1211*c* such that the buffered data of the buffer memory 1214*a* are encrypted, and may store the encrypted data in the non-volatile memory device 1220.

The security manager 1211 is configured to perform a secure read operation. For example, based on the secure read request from the host device 1100, the command manager 1211*a* may load the encrypted data from the non-volatile memory device 1220 to the buffer memory 1214*a* of the volatile memory device 1214, may control the key manager 1211*b* and the encryption manager 1211*c* such that the loaded data are decrypted, and may provide the decrypted data to the host device 1100.

The mapping table 1212 is configured to store a mapping relationship between a logical address and a physical address. The logical address may be used for the host device 1100 to identify data. The logical address may be, for example, at least one of a logical block address (LBA) and/or a logical page address (LPN). The physical address may be used to identify a page in a physical data block of the non-volatile memory device 1220. The mapping relationship may be referred to as "mapping information". In some embodiments, the mapping table 1212 may be implemented in the volatile memory device 1214. The mapping table 1212 may be backed up to the non-volatile memory device 1220.

According to at least one embodiment, the security manager 1211 is configured to manage the mapping table 1212. For example, when the write request is received, the security manager 1211 may generate (e.g., store) a new mapping relationship in the mapping table 1212. When the read request is received, the security manager 1211 may access a page of a physical data block of the non-volatile memory device 1220 with reference to the mapping relationship of the mapping table 1212. When a delete request (e.g., an un-mapping request) is received, the security manager 1211 may delete the mapping relationship of the mapping table 1212 and may decrease a valid page count of a physical data block targeted for the delete request. The security manager 1211 may perform a physical erase operation of a physical data block whose valid page count has a specific value (e.g., "0"), with reference to the mapping table 1212.

The processor 1213 is configured to control an overall operation of the storage controller 1210. The processor 1213 may be hardware that physically implements functions of a software module.

The volatile memory device 1214 is a device, in which data stored therein are lost when a power is turned off, such as a dynamic random access memory (DRAM) device or a static random access memory (SRAM) device. The volatile memory device 1214 may include the buffer memory 1214*a*. The buffer memory 1214*a* may buffer data from the host device 1100 and/or may buffer encrypted data from the non-volatile memory device 1220. Also, the volatile memory device 1214 may be used as a buffer memory and/or a cache memory of the storage controller 1210.

The PMIC 1215 is configured to manage a power of the storage controller 1210. For example, the PMIC 1215 may receive a power supply voltage from the host device 1100 and may provide voltages necessary for the storage controller 1210 and the non-volatile memory device 1220 based on the power supply voltage.

The storage controller 1210 is configured to communicate with the host device 1100 through the host interface circuit 1216. In some embodiments, the host interface circuit 1216 may be implemented based on at least one of various interfaces such as a serial advanced technology attachment (SATA) interface, a peripheral component interconnect express (PCIe) interface, a serial attached small computer system interface (SCSI) (SAS), a non-volatile memory express (NVMe) interface, a universal flash storage (UFS) interface, and/or the like.

The storage controller 1210 is configured to communicate with the non-volatile memory device 1220 through the non-volatile memory interface circuit 1217. In some embodiments, the non-volatile memory interface circuit 1217 may be implemented based on a NAND interface.

Figure 3:
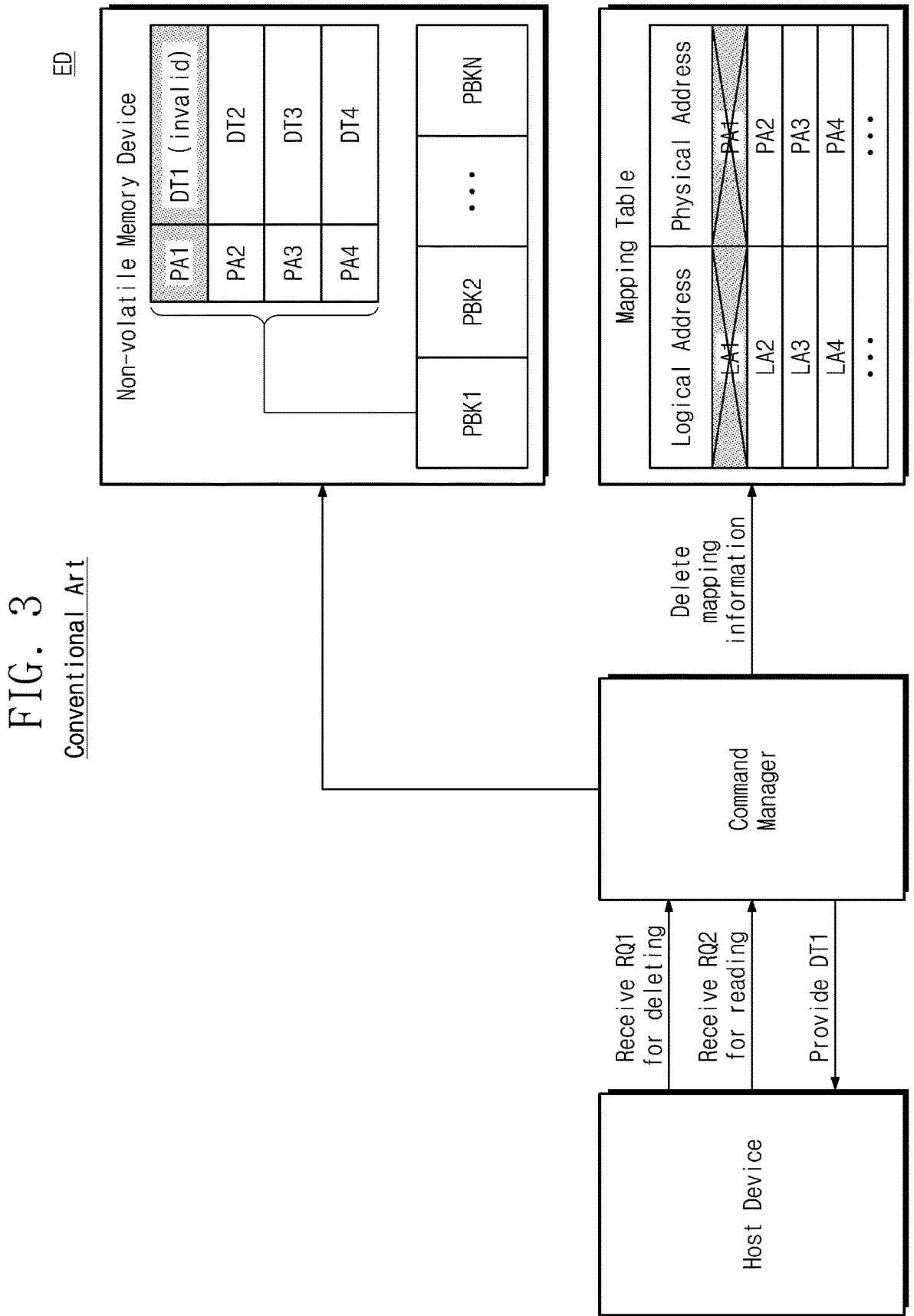
FIG. 3 is a diagram describing a conventional electronic device.

FIG. 3 is a diagram describing a conventional electronic device. A conventional electronic device ED will be described with reference to FIG. 3. For better understanding of the present disclosure, components and operations of the conventional electronic device ED will be described, but the conventional electronic device ED may include technical features not disclosed in documents of the information disclosure statement and is not intended to limit the scope and spirit of the invention.

The conventional electronic device ED may include a host device, a command manager, a mapping table, and a non-volatile memory device. The command manager, the mapping table, and the non-volatile memory device may be collectively referred to as a "storage device".

The mapping table may store mapping relationships between logical addresses and physical addresses. For example, the mapping table may store a mapping table of a first logical address LA1 and a first physical address PAL. As in the above description, the mapping table may store mapping relationships between second to fourth logical addresses LA2 to LA4 and second to fourth physical addresses PA2 to PA4.

The non-volatile memory device may include the plurality of data blocks PBK1 to PBKN. Each of the plurality of data blocks PBK1 to PBKN may include a plurality of pages. For example, the first data block PBK1 may include first to fourth pages respectively identified by the first to fourth physical addresses PA1 to PA4. The first to fourth pages of the first data block PBK1 may respectively store first to fourth data DT1 to DT4.

The command manager may receive a first request RQ1 for deleting the first data DT1 from the host device. The first request RQ1 may include the first logical address LA1 corresponding to the first data DT1. The command manager may delete the mapping relationship (e.g., mapping information) of the first logical address LA1 and the first physical address PA1 from the mapping table, based on the first request RQ1. In the first data block PBK1, the first data DT1 may be invalid data, and the second to fourth data DT2 to DT4 may be valid data.

The command manager may decrease a valid page count of the first data block PBK1 from "4" to "3" with reference to the mapping table. Because the valid page count of the first data block PBK1 is not "0", the command manager does not perform the physical erase operation of the first data block PBK1. That is, the command manager may perform only the un-mapping of the mapping relationship based on the first request RQ1, and the first data block PBK1 may still maintain the first data DT1.

The command manager may receive a second request RQ2 for reading the first data DT1 from the host device. The host device may recover the un-mapped first physical address PA1 in compliance with a mapping rule of the mapping table and may provide the second request RQ2 including information of the first physical address PA1 thus recovered. Alternatively, the command manager may recover the un-mapped first physical address PA1 with reference to any other physical address (e.g., the second physical address PA2) in the mapping table. The command manager may fetch the first data DT1 of the first page by accessing the first page corresponding to the first physical address PA1 of the first data block PBK1 in the non-volatile memory device based on the recovered first physical address PAL. The command manager may provide the first data DT1 to the host device.

As described above, the conventional electronic device ED may physically maintain deleted (e.g., un-mapped) data and may provide the deleted data to the host device depending on a next request. That is, in the case where a malicious user recovers only a mapping relationship, the malicious user may also access the deleted data and may check the content of the deleted data. Therefore, the security or validity of the delete operation may not be guaranteed.

Alternatively, unlike the description given with reference to FIG. 3, a technique for physically erasing all the data of the first data block PBK1 may be considered. However, when the physical erase operation is performed even in the case where only the first data DT1 of the first data block PBK1 are invalid and the remaining data of the first data block PBK1 are valid, a write amplification factor for backing up the valid data may increase, the number of program/erase cycles and power consumption of the non-volatile memory device may increase, data processing may be delayed, and/or the life-time of the non-volatile memory device may decrease.

Accordingly, a technique for guaranteeing the security or validity of the delete operation without performing the physical erase operation of a physical data block unit and while performing the delete (e.g., un-mapping) operation of a data chunk unit would improve the functionality of non-volatile memory device.

Figure 4:
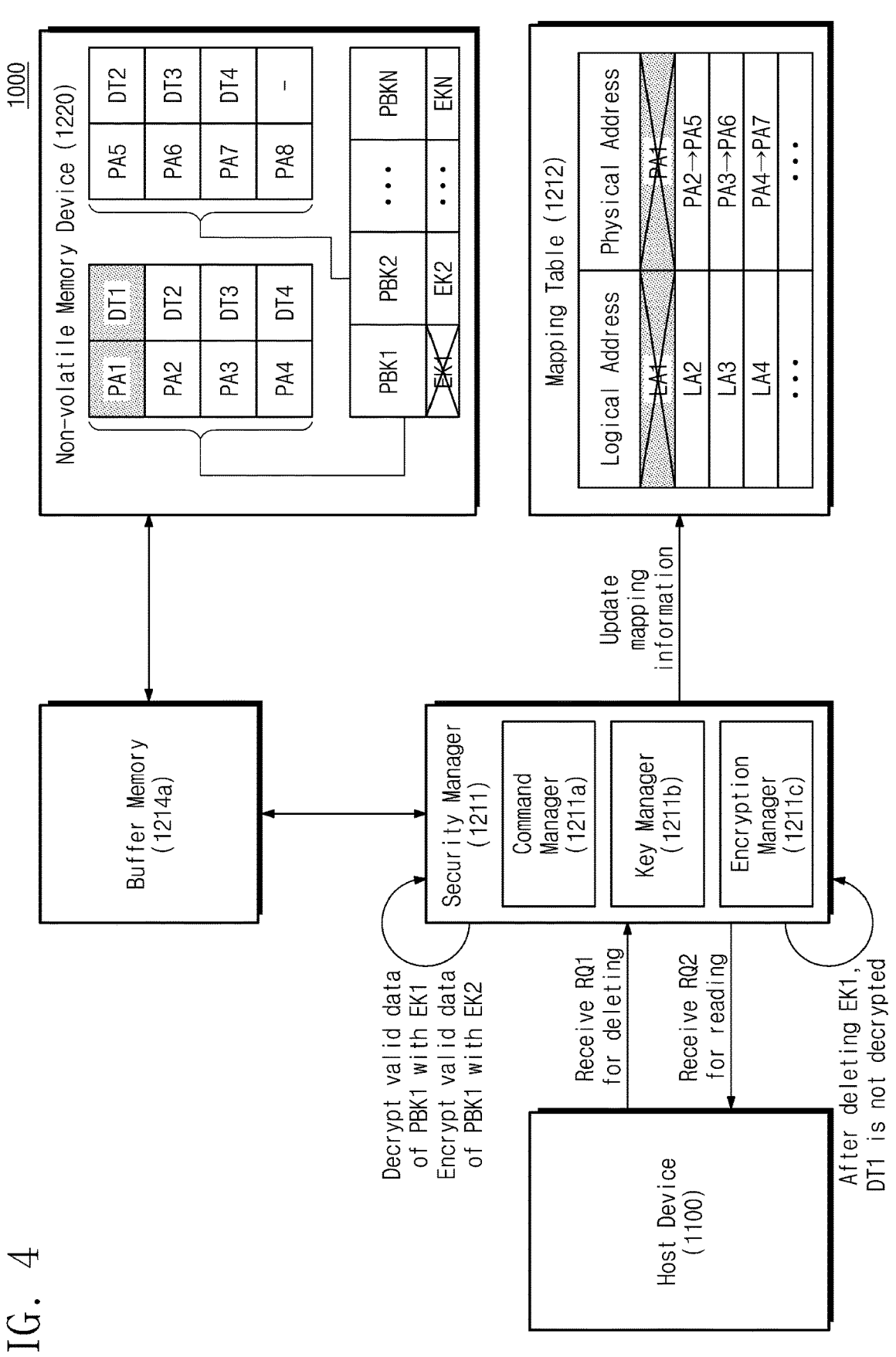
FIG. 4 is a diagram describing an electronic device according to some embodiments of the present disclosure.

FIG. 4 is a diagram describing an electronic device according to some embodiments of the present disclosure. Referring to FIG. 4, the electronic device 1000 may include the host device 1100, the security manager 1211, the mapping table 1212, the buffer memory 1214a, and the non-volatile memory device 1220.

The security manager 1211 includes the command manager 1211a, the key manager 1211b, and the encryption manager 1211c.

The mapping table 1212 is configured to store mapping relationships between logical addresses and physical addresses. For example, the mapping table 1212 may store mapping relationships between the first to fourth logical addresses LA1 to LA4 and the first to fourth physical addresses PA1 to PA4.

The non-volatile memory device 1220 is configured to include the plurality of data blocks PBK1 to PBKN. The plurality of data blocks PBK1 to PBKN may store data that are encrypted by using the plurality of encryption keys EK1 to EKN. Each of the plurality of data blocks PBK1 to PBKN may include a plurality of pages. For example, the first data block PBK1 may include the first to fourth pages respectively identified by the first to fourth physical addresses PA1 to PA4. The first to fourth pages of the first data block PBK1 may respectively store the first to fourth data DT1 to DT4 encrypted by using the first encryption key EK1.

The security manager 1211 may receive the first request RQ1 for deleting the first data DT1. The first request RQ1 may include the first logical address LA1 corresponding to the first data DT1. When the first request RQ1 is received, the command manager 1211a is configured to load valid data of the first data block PBK1 of the non-volatile memory device 1220 to the buffer memory 1214a with reference to the mapping table 1212. The valid data may include, e.g., the second to fourth data DT2 to DT4.

The key manager 1211b is configured to provide the first encryption key EK1 to the encryption manager 1211c under control of the command manager 1211a. The first encryption key EK1 may be an old key. Under control of the command manager 1211a, the encryption manager 1211c may decrypt the second to fourth data DT2 to DT4 using the first encryption key EK1 and the decrypted second to fourth data DT2 to DT4 may be loaded to the buffer memory 1214a.

The key manager 1211b is configured to provide the second encryption key EK2 to the encryption manager 1211c under control of the command manager 1211a. The second encryption key EK2 may be a new key. In at least one embodiment, the new key is generated using a random number generator configured to generate a n-bit number. Under control of the command manager 1211a, the encryption manager 1211c may encrypt the decrypted second to fourth data DT2 to DT4 in the buffer memory 1214a using the second encryption key EK2.

The command manager 1211a is configured to store the second to fourth data DT2 to DT4 in the buffer memory 1214a, which are encrypted using the second encryption key EK2, at fifth to seventh pages respectively identified by fifth to seventh physical addresses PA5 to PA7 of the second data block PBK2 of the non-volatile memory device 1220. The key manager 1211*b* may delete the first encryption key EK1 under the control of the command manager 1211*a*.

The command manager 1211*a* is configured to update the mapping relationship (e.g., mapping information) of the mapping table 1212. For example, the command manager 1211*a* may delete the mapping relationship of the first logical address LA1 in the mapping table 1212 and/or, the mapping table 1212 may store (or overwrite) mapping relationships of the second to fourth logical addresses LA2 to LA4 and the fifth to seventh physical addresses PA5 to PA7 in the mapping table 1212.

Afterwards, the security manager 1211 may receive the second request RQ2 for reading the first data DT1. If the second request is from a malicious user, the malicious user may recover the mapping relationship of the first logical address LA1 deleted in the mapping table 1212, and the security manager 1211 may load the first data DT1 of the first data block PBK1 from the non-volatile memory device 1220 to the buffer memory 1214*a*. However, because the first data DT1 is encrypted using the first encryption key EK1 and the first encryption key EK1 is deleted, the key manager 1211*b* may not decrypt the first data DT1, and therefore, the first data DT1 may be protected from the malicious user.

As described above, according to at least one embodiment of the present disclosure, it may be impossible to recover the un-mapped data by deleting an encryption key based on the delete request of the data chunk unit. Accordingly, the security or validity of the delete operation may be guaranteed.

Figure 5:
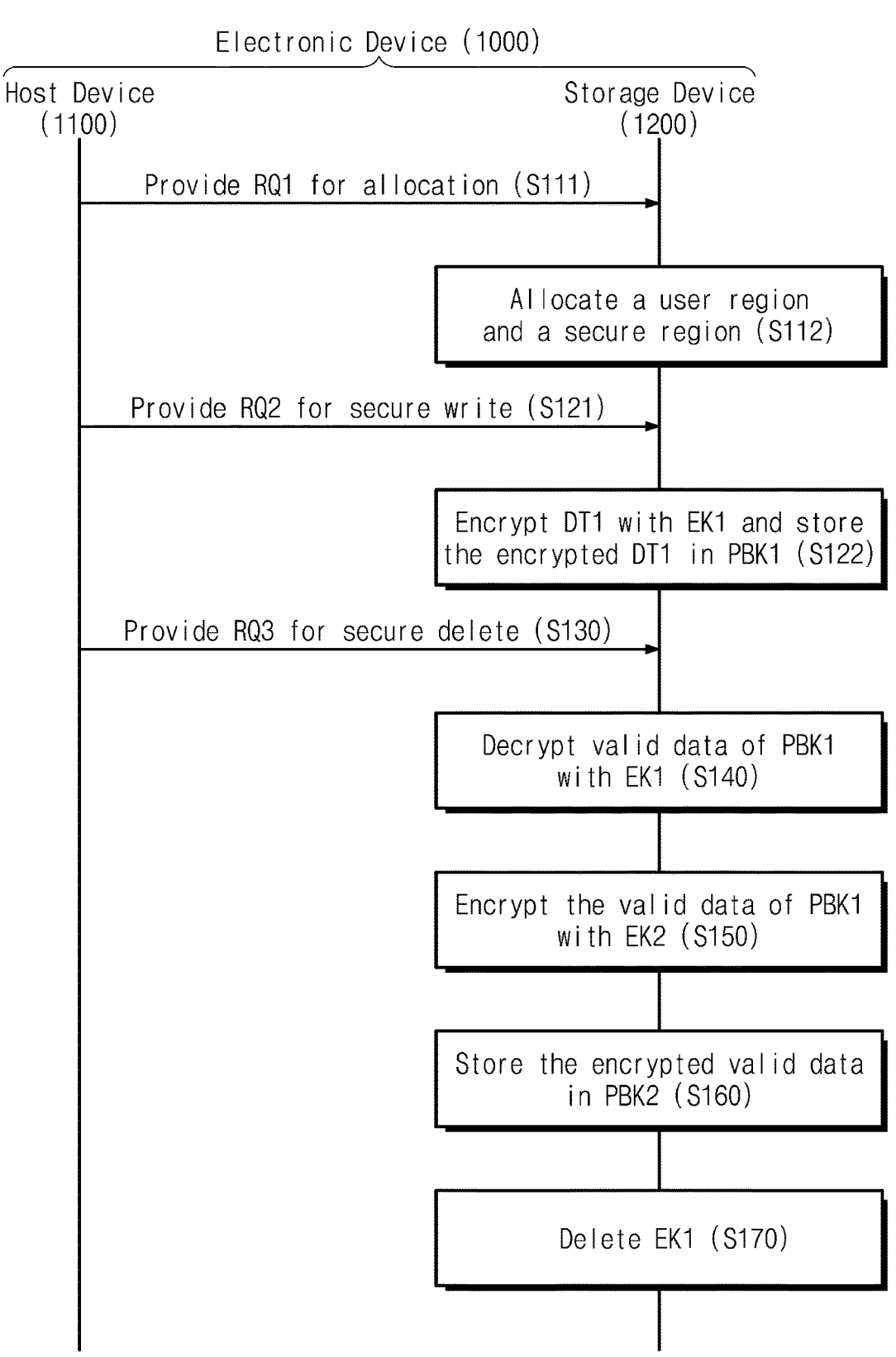
FIG. 5 is a flowchart describing a method of operating an electronic device according to some embodiments of the present disclosure.

FIG. 5 is a flowchart describing a method of operating an electronic device according to some embodiments of the present disclosure. Referring to FIG. 5, the electronic device 1000 may include the host device 1100 and the storage device 1200.

In operation S111, the host device 1100 provides the first request RQ1 for allocation to the storage device 1200. The first request RQ1 may be used to direct an allocation operation of a secure region and a user region. The first request RQ1 may include an address range of the secure region.

In operation S112, the storage device 1200 allocates the user region and the secure region based on the first request RQ1. The user region may store unencrypted data or data encrypted in compliance with the security policy different from the security policy of the present disclosure. The secure region may store encrypted data.

In operation S121, the host device 1100 provides the storage device 1200 with the second request RQ2 for the secure write operation of the first data DT1. A buffer memory of the storage device 1200 may temporarily store the first data DT1.

In operation S122, based on the second request RQ2, the storage device 1200 encrypts the first data DT1 of the buffer memory using the first encryption key EK1 and stores the first data DT1 thus encrypted in the first data block PBK1 of the secure region of a non-volatile memory device.

In some embodiments, the first data DT1 may have a chunk size. The chunk size may correspond to a size of a logical block address LBA of the host device 1100 and/or may correspond to a unit of a write operation (or a page unit) of the storage device 1200. The chunk size may be smaller than a unit of a physical erase operation of the storage device 1200.

In some embodiments, the electronic device 1000 may maintain the allocation of the secure region while maintaining the allocation of the user region. For example, after operation S112, the storage device 1200 may receive a request for a non-secure write operation of data of a user data block (e.g., a normal write operation not accompanying the encryption operation) from the host device 1100. The storage device 1200 may store unencrypted data and/or data encrypted in compliance a policy different from with the security policy of the present disclosure in the user data block of the user region of the non-volatile memory device, based on the request of the host device 1100.

In operation S130, the host device 1100 may provide the storage device 1200 with a third request RQ3 for a secure delete operation of the first data DT1. The third request RQ3 may indicate invalid data in a data block of the secure region. The data indicated by the third request RQ3 may be un-mapped.

In some embodiments, the third request RQ3 may indicate a plurality of invalid data in the same data block. For example, the third request RQ3 may further indicate any other invalid data of the first data block PBK1 in addition to the first data DT1.

In operation S140, based on the third request RQ3, the storage device 1200 loads valid data of the first data block PBK1 and decrypts the loaded valid data by using the first encryption key EK1. The valid data may include the second data DT2 the first data block PBK1, which are different from the first data DT1. The valid data may not include the first data DT1 indicated by the third request RQ3.

In operation S150, the storage device 1200 encrypts the data of operation S140 (e.g., the valid data of the first data block PBK1 decrypted using the first encryption key EK1) by using the second encryption key EK2.

In operation S160, the storage device 1200 stores the data of operation S150 (e.g., the valid data of the first data block PBK1 encrypted by using the second encryption key EK2) in the second data block PBK2 of the secure region.

In operation S170, the storage device 1200 may delete the first encryption key EK1. As the first encryption key EK1 is deleted, it may be practically impossible to recover the first data DT1 of the first data block PBK1 (or that the first data DT1 of the first data block PBK1 is unrecoverable may be guaranteed).

Figure 6:
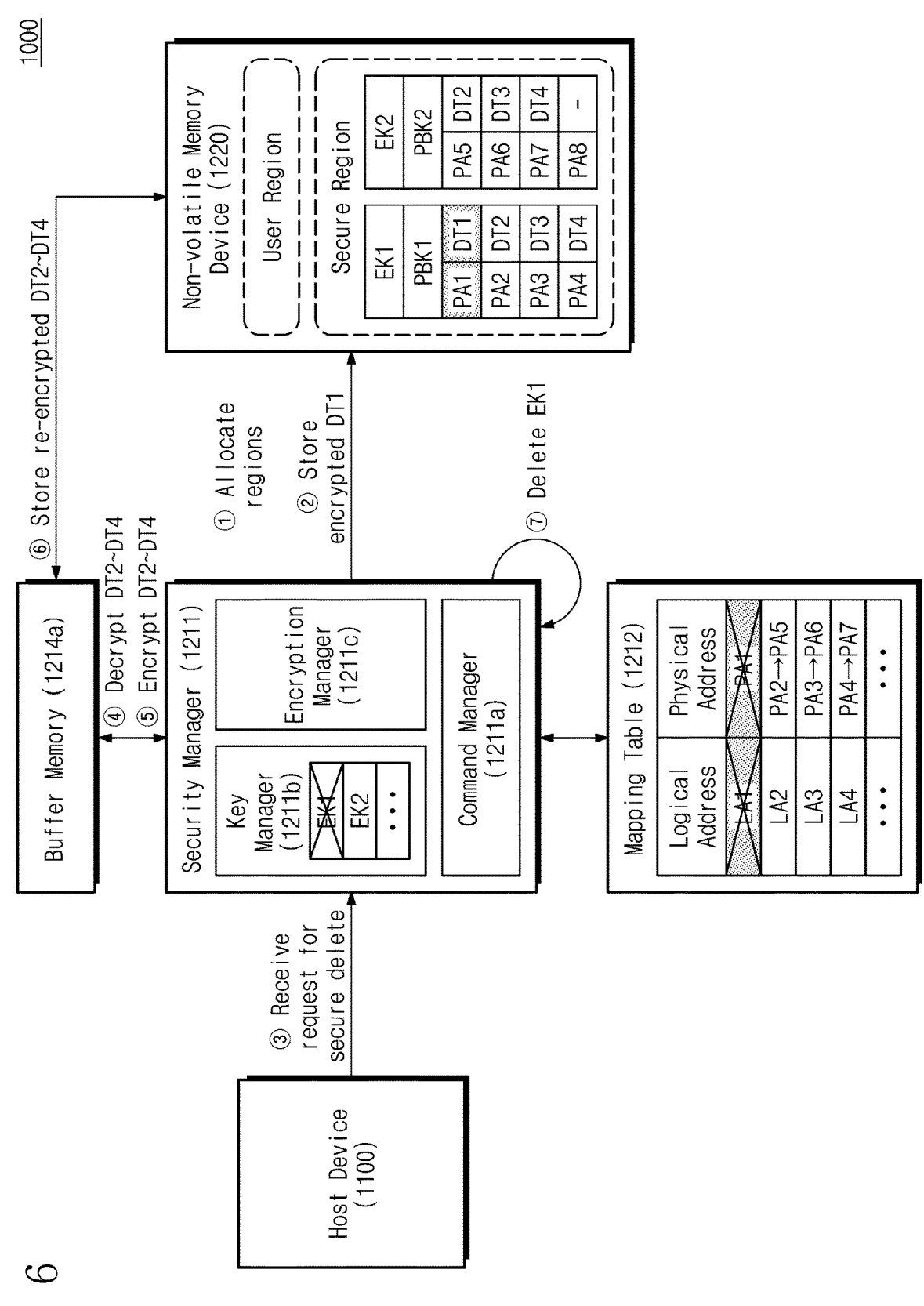
FIG. 6 is a diagram describing a secure operation of an electronic device according to some embodiments of the present disclosure.

FIG. 6 is a diagram describing a secure operation of an electronic device according to some embodiments of the present disclosure. Referring to FIG. 6, the electronic device 1000 includes the host device 1100, the security manager 1211, the mapping table 1212, the buffer memory 1214*a*, and the non-volatile memory device 1220. The electronic device 1000 may correspond to the electronic device 1000 of FIG. 5.

The security manager 1211 includes the command manager 1211*a*, the key manager 1211*b*, and the encryption manager 1211*c*. The key manager 1211*b* may manage the first encryption key EK1 and the second encryption key EK2.

The mapping table 1212 is configured to store mapping relationships between logical addresses and physical addresses. For example, the mapping table 1212 may store mapping relationships of the first to fourth logical addresses LA1 to LA4.

The non-volatile memory device 1220 includes a user region and a secure region. The secure region may include the first data block PBK1 and the second data block PBK2. The first data block PBK1 may include the first to fourth pages corresponding to the first to fourth physical addresses PA1 to PA4. The first to fourth pages may store data encrypted by the first encryption key EK1. The second data block PBK2 may include the fifth to eighth pages corresponding to the fifth to eighth physical addresses PA5 to PA8. The fifth to eighth pages may store data encrypted by the second encryption key EK2.

Below, the secure operation of the electronic device 1000 will be described. The secure operation may include a region allocation operation, a secure write operation, and a secure delete operation.

In a first operation ①, the security manager 1211 allocates the secure region and the user region.

In a second operation ②, based on the secure write request from the host device 1100, the security manager 1211 encrypts the first data DT1 by using the first encryption key EK1 and stores the encrypted first data DT1 to the first page of the first data block PBK1. The first page of the first data block PBK1 may be identified by the first physical address PAL. As in the above description, the second to fourth pages corresponding to the second to fourth physical addresses PA2 to PA4 of the first data block PBK1 may store the second to fourth data DT2 to DT4 encrypted by using the first encryption key EK1.

In a third operation ③, the security manager 1211 receives a request for the secure delete operation of the first data DT1. Based on the request, the command manager 1211a may obtain a physical address of valid data of the first data block PBK1 with reference to the mapping table 1212 and may load the valid data of the first data block PBK1 to the buffer memory 1214a. The valid data may include the second to fourth data DT2 to DT4. The valid data may not include the first data DT1.

The security manager 1211 triggers the secure delete operation depending on the timing internally determined in compliance with the internal policy (e.g., may start a fourth operation ④) and/or may trigger the secure delete operation depending on the timing determined by the host device 1100. For example, the security manager 1211 may determine the timing to perform the secure delete operation in compliance with the internal policy of the storage device 1200 regardless of the host device 1100. As another example, the security manager 1211 may determine the timing to perform the secure delete operation based on the timing determined by the host device 1100. Embodiments in which the secure delete operation is triggered by the host device 1100 will be described in detail with reference to FIGS. 13 and 14.

In the fourth operation ④, the key manager 1211b provides the first encryption key EK1 to the encryption manager 1211c under control of the command manager 1211a. The first encryption key EK1 may be an old key. Under control of the command manager 1211a, the encryption manager 1211c may decrypt the second to fourth data DT2 to DT4 loaded to the buffer memory 1214a by using the first encryption key EK1.

In a fifth operation ⑤, the key manager 1211b provides the second encryption key EK2 to the encryption manager 1211c under control of the command manager 1211a. The second encryption key EK2 may be a new key. Under control of the command manager 1211a, the encryption manager 1211c may encrypt the decrypted second to fourth data DT2 to DT4 in the buffer memory 1214a by using the second encryption key EK2 (e.g., may re-encrypt the decrypted second to fourth data DT2 to DT4 by using a new key).

In a sixth operation ⑥, the command manager 1211a stores the second to fourth data DT2 to DT4 re-encrypted by using the second encryption key EK2 at the fifth to seventh pages of the second data block PBK2. The fifth to seventh pages may be identified by the fifth to seventh physical addresses PA5 to PA7.

The command manager 1211a updates the mapping relationship of the mapping table 1212. For example, the command manager 1211a deletes the mapping relationship of the first logical address LA1 in the mapping table 1212. The command manager 1211a may update mapping relationships of the mapping table 1212 such that the second to fourth logical Address LA2 to LA4 are respectively mapped to the fifth to seventh physical Address PA5 to PA7.

In a seventh operation ⑦, the key manager 1211b deletes the first encryption key EK1 under control of the command manager 1211a. After the first encryption key EK1 is deleted, it may be practically impossible to recover the first data DT1 of the first data block PBK1.

Figure 7:
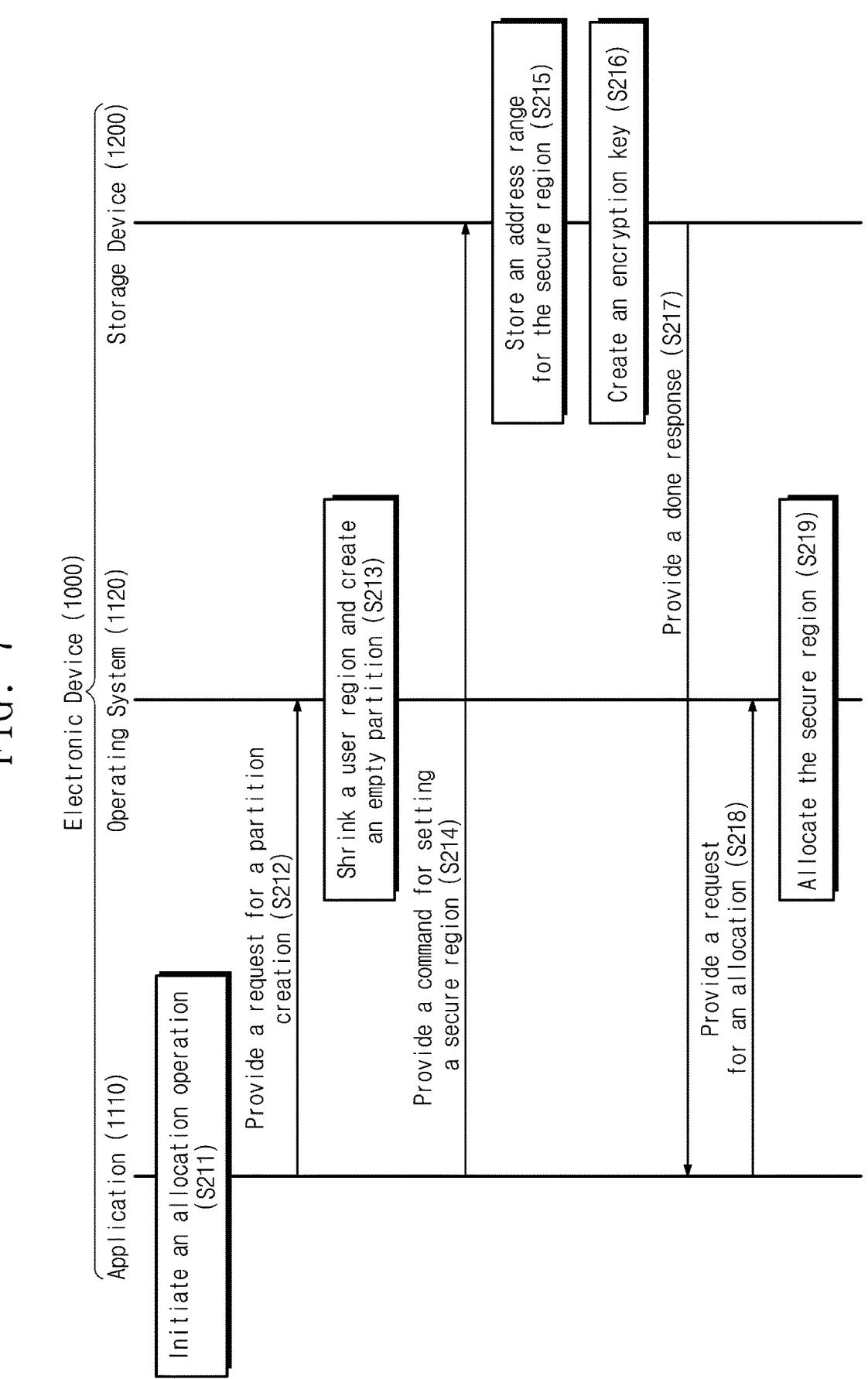
FIG. 7 is a flowchart describing allocation of a secure region of an electronic device according to some embodiments of the present disclosure.

FIG. 7 is a flowchart describing allocation of a secure region of an electronic device according to some embodiments of the present disclosure. Referring to FIG. 7, the electronic device 1000 may include the application 1110, the operating system 1120, and the storage device 1200. The application 1110 and the operating system 1120 may be collectively referred to as a "host device".

In operation S211, the application 1110 initiates an allocation operation. For example, the user of the electronic device 1000 may initiate the allocation operation by controlling the application 1110 through a separate interface device.

In operation S212, the application 1110 provides the operating system 1120 with a request for partition creation.

In operation S213, the operating system 1120 shrinks a previously allocated user region. The operating system 1120 may create an empty partition corresponding to the shrunk user region. When the empty partition already exists, the operation of shrinking the user region may be skipped.

In operation S214, the application 1110 provides the storage device 1200 a command for setting a secure region. The command may indicate the allocation operation of the secure region. The command may include an address range of the secure region (e.g., an LBA range defined by a first LBA indicating a start of the secure region and a second LBA indicating an end of the secure region). In some embodiments, the command may be implemented as a set feature command of the NVMe standard.

In operation S215, the storage device 1200 stores the address range for the secure region.

In operation S216, the storage device 1200 creates an encryption key for managing data of the secure region.

In operation S217, the storage device 1200 provides a done response to the application 1110. The done response may indicate that the secure region is completely set. Alternatively, the done response may indicate that the command in operation S214 is processed.

In operation S218, the application 1110 provides the operating system 1120 a request for allocating the secure region.

In operation S219, the operating system 1120 allocates the secure region. The operating system 1120 may determine that the secure region for the empty partition is completely allocated. Afterwards, the storage device 1200 may perform the secure write operation, the secure read operation, and the secure delete operation on the secure region depending on a request of the application 1110 or the operating system 1120.

Figure 8:
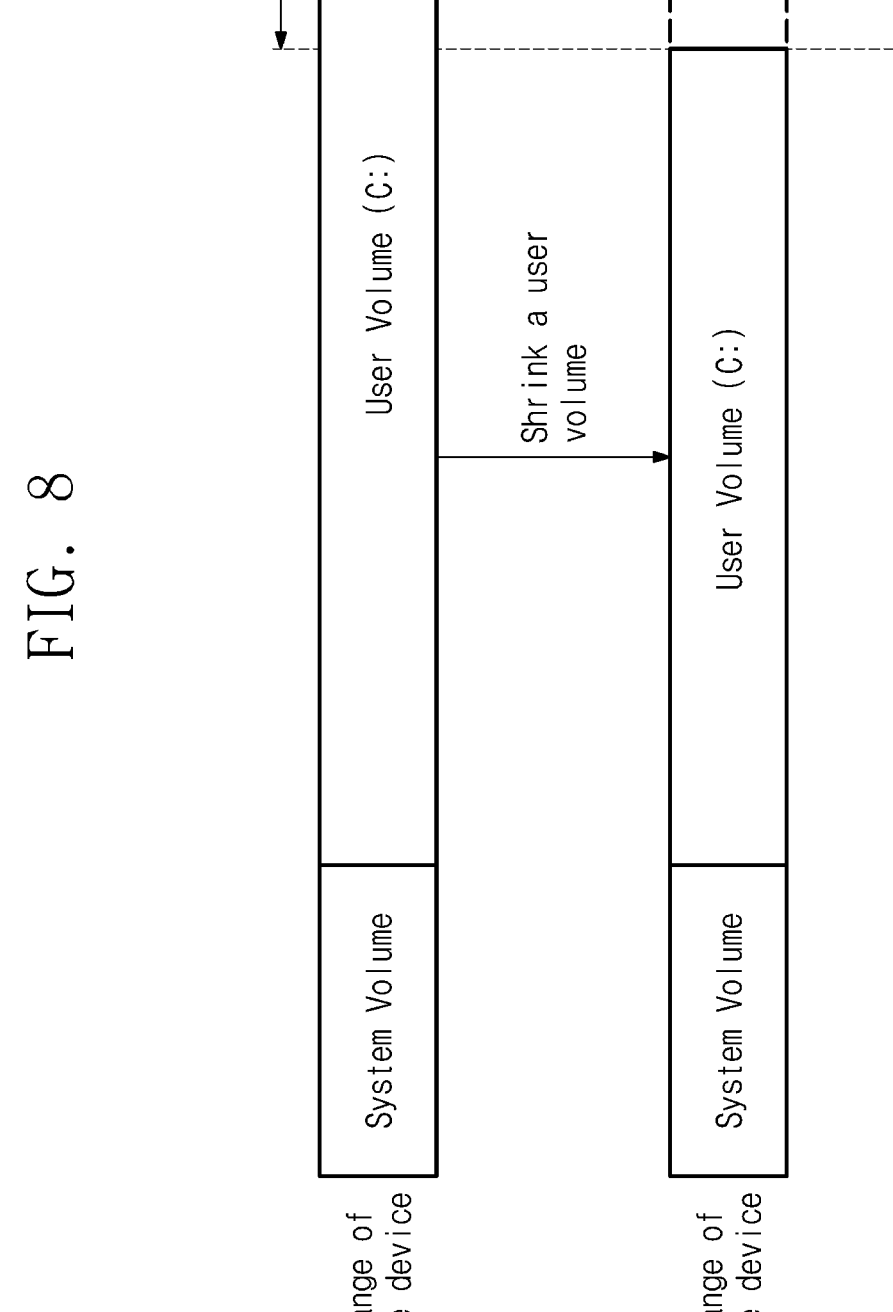
FIG. 8 is a diagram describing an address range of FIG. 7, according to some embodiments of the present disclosure.

FIG. 8 is a diagram describing an address range of FIG. 7, according to some embodiments of the present disclosure. The address range of the storage device 1200 and that is managed by the operating system 1120 will be described with reference to FIGS. 7 and 8. The address range may be an LBA range.

The LBA range of the storage device 1200 may include a system volume and a user volume. The system volume may store data necessary for an operation of a system (e.g., an operating system). The system volume may be referred to as a "system region". The user volume may store data such as image data, video data, text data, and audio data. The user volume may be referred to as a "user region" or "drive C".

The operating system 1120 may shrink the user volume allocated to the storage device 1200. An empty partition having a size of the shrunk user volume may be created. The operating system 1120 may allocate a secure volume to the empty partition. The secure volume may store encrypted data. The secure volume may be referred to as a "secure region" or "drive S". Depending on a request of the application 1110, the operating system 1120 may enable the secure operation in the secure volume or may disable the secure operation. Depending on a request of the application 1110, the operating system 1120 may deallocate the secure volume and may create an empty partition.

Figure 9:
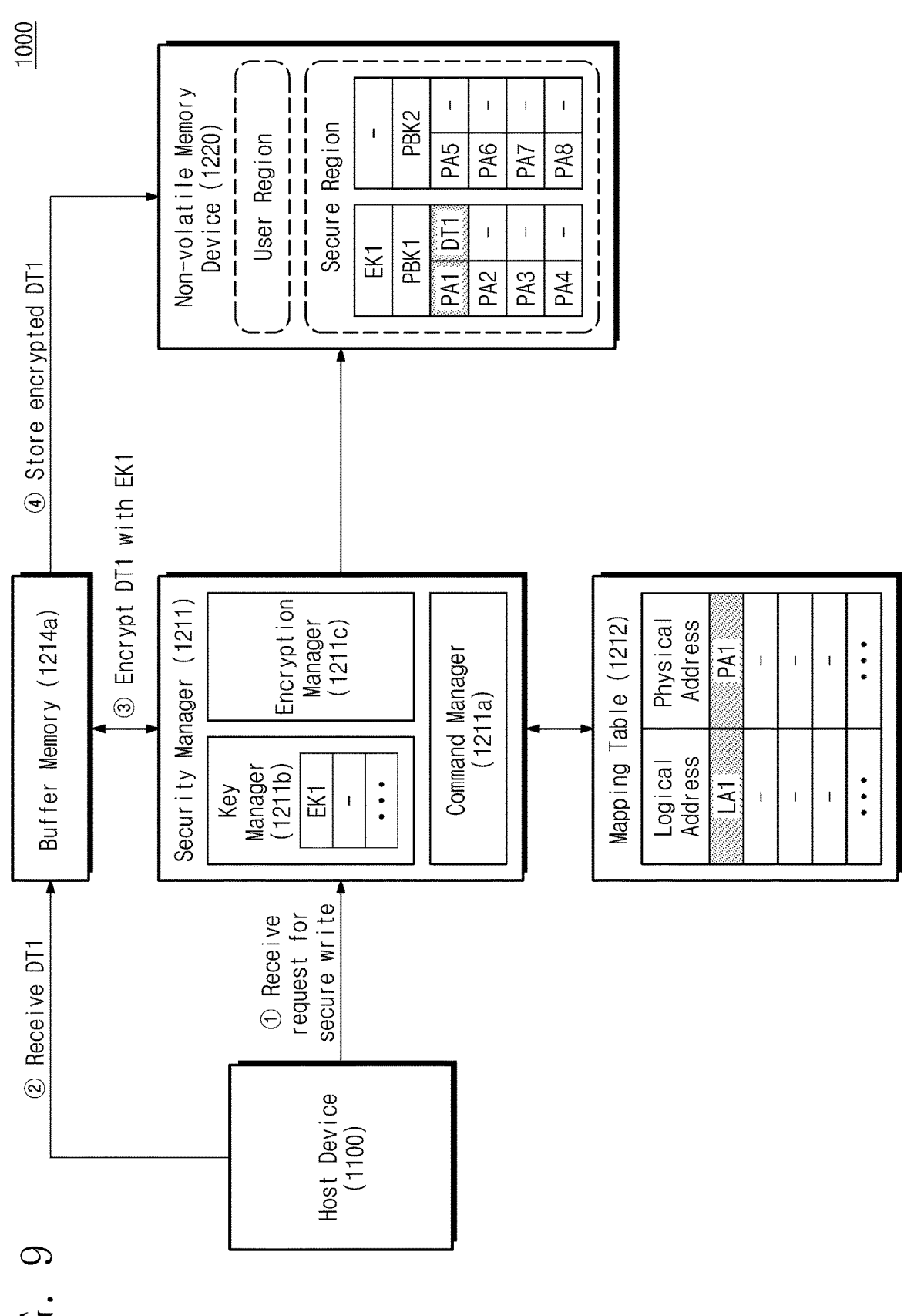
FIG. 9 is a diagram describing a secure write operation of an electronic device according to some embodiments of the present disclosure.

FIG. 9 is a diagram describing a secure write operation of an electronic device according to some embodiments of the present disclosure. Referring to FIG. 9, the electronic device 1000 includes the host device 1100, the security manager 1211, the mapping table 1212, the buffer memory 1214a, and the non-volatile memory device 1220. The security manager 1211 includes the command manager 1211a, the key manager 1211b, and the encryption manager 1211c. The key manager 1211b is configured to manage an encryption key. The mapping table 1212 is configured to store a mapping relationship between a logical address and a physical address. The non-volatile memory device 1220 includes a user region and a secure region. The secure region may include the first data block PBK1 and the second data block PBK2.

Below, the secure write operation of the electronic device 1000 will be described.

In a first operation ①, the security manager 1211 may receive a request for the secure write operation of the first data DT1 from the host device 1100. The request may include the first logical address LA1 of the first data DT1.

In a second operation ②, the buffer memory 1214a receives the first data DT1 corresponding to the secure write operation from the host device 1100 under control of the security manager 1211. The buffer memory 1214a may buffer the first data DT1.

In a third operation ③, the key manager 1211b provides the first encryption key EK1 to the encryption manager 1211c under control of the command manager 1211a. Under control of the command manager 1211a, the encryption manager 1211c may encrypt the first data DT1 buffered in the buffer memory 1214a by using the first encryption key EK1.

In a fourth operation ④, with reference to the mapping table 1212, the command manager 1211a searches for the first physical address PA1 corresponding to an empty page, generates a mapping relationship of the first logical address LA1 and the first physical address PA1, and stores the mapping relationship in the mapping table 1212. The command manager 1211a stores the encrypted first data DT1 of the buffer memory 1214a at the first page of the first data block PBK1 in the secure region, which corresponds to the first physical address PA1, based on the first physical address PAL.

Figure 10:
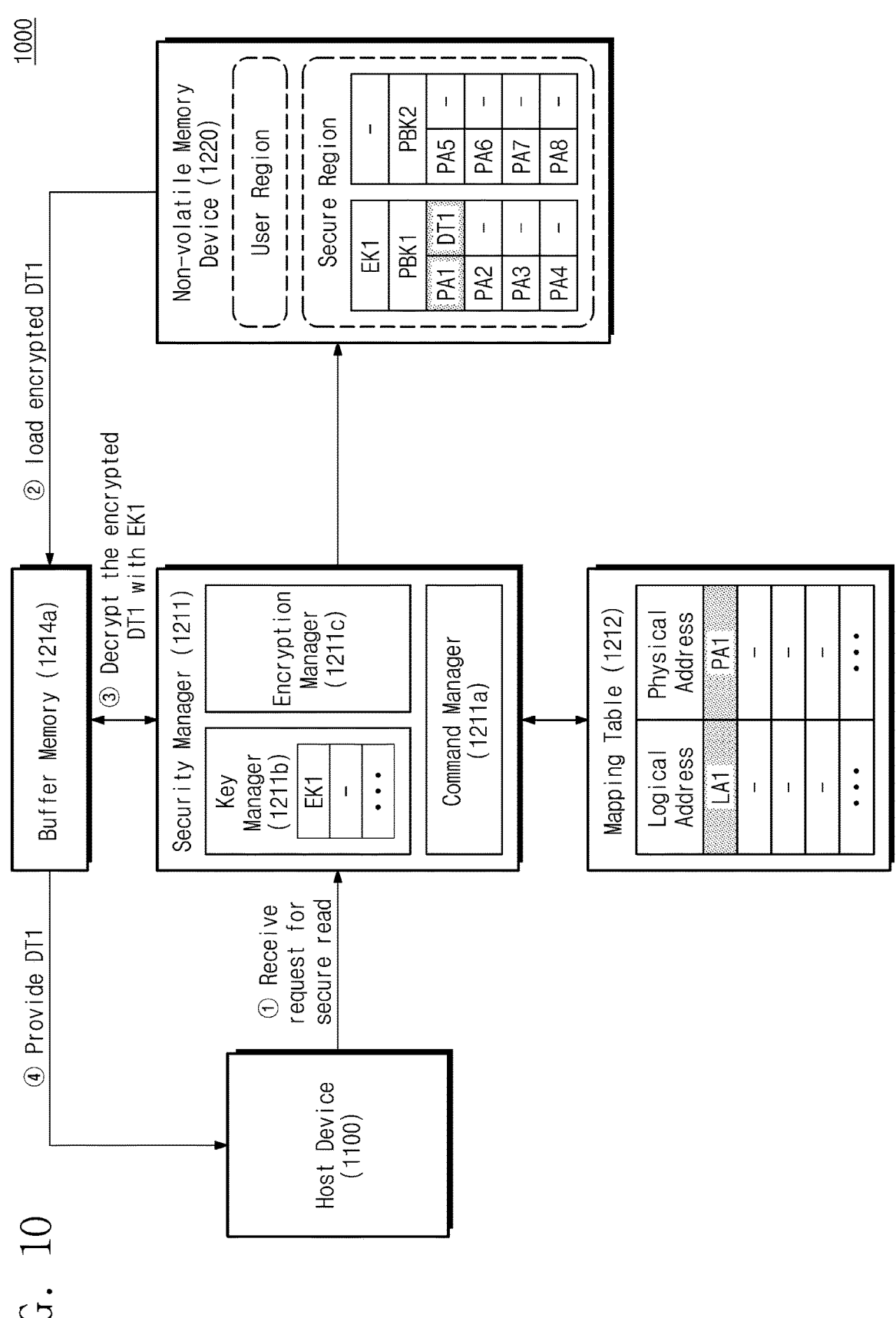
FIG. 10 is a diagram describing a secure read operation of an electronic device according to some embodiments of the present disclosure.

FIG. 10 is a diagram describing a secure read operation of an electronic device according to some embodiments of the present disclosure. Referring to FIG. 10, the electronic device 1000 includes the host device 1100, the security manager 1211, the mapping table 1212, the buffer memory 1214a, and the non-volatile memory device 1220. The security manager 1211 includes the command manager 1211a, the key manager 1211b, and the encryption manager 1211c. The key manager 1211b is configured to manage an encryption key. The mapping table 1212 is configured to store a mapping relationship between a logical address and a physical address. The non-volatile memory device 1220 includes a user region and a secure region. The secure region includes the first data block PBK1 and the second data block PBK2.

Below, the secure read operation of the electronic device 1000 will be described.

In a first operation ①, the security manager 1211 may receive a request for the secure read operation of the first data DT1 from the host device 1100. The request may include the first logical address LA1 of the first data DT1.

In a second operation ②, the command manager 1211a searches for the first physical address PA1 having a mapping relationship with the first logical address LA1 with reference to the mapping table 1212. The command manager 1211a loads the first data DT1 stored at the first page of the first data block PBK1 to the buffer memory 1214a based on the first physical address PAL. The buffer memory 1214a buffers the first data DT1. The first data DT1 is data encrypted by using the first encryption key EK1 in the previous secure write operation.

In a third operation ③, the key manager 1211b provides the first encryption key EK1 to the encryption manager 1211c under control of the command manager 1211a. Under control of the command manager 1211a, the encryption manager 1211c decrypts the first data DT1 buffered in the buffer memory 1214a by using the first encryption key EK1.

In a fourth operation ④, the command manager 1211a provides the decrypted first data DT1 of the buffer memory 1214a to the host device 1100.

Figure 11:
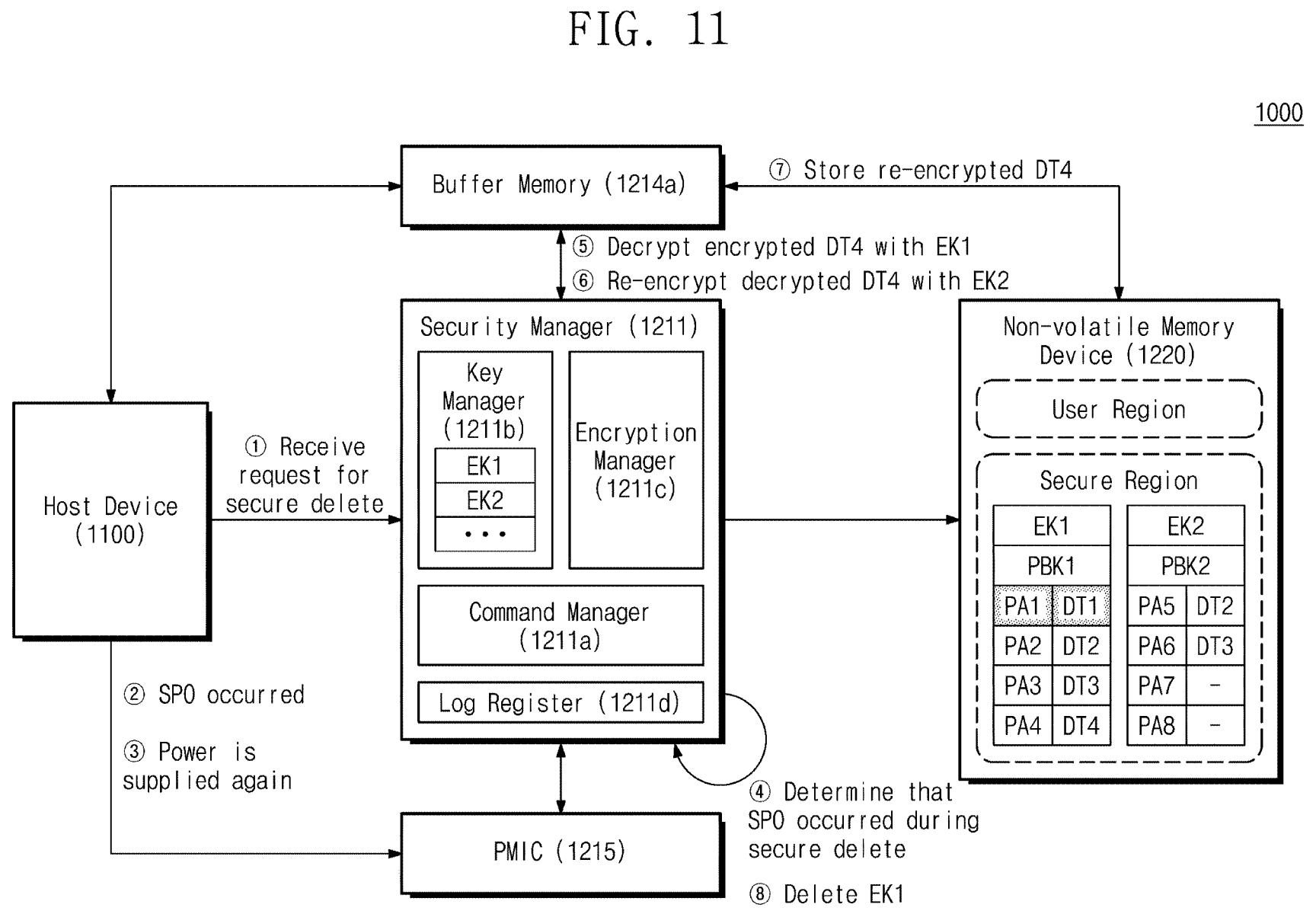

FIG. 11 is a diagram describing a secure delete operation resumed after a sudden power off (SPO) event, according to some embodiments of the present disclosure. Referring to FIG. 11, the electronic device 1000 includes the host device 1100, the security manager 1211, the buffer memory 1214a, the PMIC 1215, and the non-volatile memory device 1220. The security manager 1211 includes the command manager 1211a, the key manager 1211b, the encryption manager 1211c, and a log register 1211d. The key manager 1211b is configured to manage an encryption key.

The log register 1211d is configured to store logs (e.g., log data) of secure delete. The logs of secure delete stored on the log register 1211d may include a start time point of the secure delete operation, a point in time when valid data are processed, an end time point of the secure delete operation, and/or the like.

For example, the first data block PBK1 may store the first to fourth data DT1, DT2, DT3, and DT4. In the secure delete operation, the second to fourth data DT2 to DT4 may be valid data.

When there is no SPO event, after a request for the secure delete operation is received from the host device 1100, the log register 1211d may store the start time point. After the second data DT2 are decrypted by using the first encryption key EK1, the second data DT2 are re-encrypted by using the second encryption key EK2, and the re-encrypted second data DT2 are stored in the second data block PBK2, the log register 1211*d* may store a point in time when the second data DT2 are processed. As in the above description, after the re-encrypted third and fourth data DT3 and DT4 are stored in the second data block PBK2, the log register 1211*d* stores points in time when the third and fourth data DT3 and DT4 are processed. After all the valid data are processed and the first encryption key EK1 is deleted, the log register 1211*d* stores a completion time point.

In contrast, when the SOP event occurs while processing the secure delete operation, the log register 1211*d* may store only some of processing time points associated with the secure delete operation. With reference to the log register 1211*d*, the command manager 1211*a* may check a point in time when the secure delete operation is suspended due to the SPO event and may resume the suspended secure delete operation.

The non-volatile memory device 1220 may include a user region and a secure region. The secure region may include the first data block PBK1 and the second data block PBK2.

Below, the secure delete operation and the secure delete operation resumed after the SPO event will be described.

In a first operation ①, the security manager 1211 may receive a request for the secure delete operation of the first data DT1. The first data DT1 may be invalid data. The second to fourth data DT2 to DT4 may be valid data.

The security manager 1211 re-encrypts the second data DT2 of the first data block PBK1 and stores the re-encrypted second data DT2 at the fifth page of the second data block PBK2, which corresponds to the fifth physical address PA5. The log register 1211*d* stores the processing time point of the second data DT2.

The security manager 1211 re-encrypts the third data DT3 of the first data block PBK1 and stores the re-encrypted third data DT3 at the sixth page of the second data block PBK2, which corresponds to the sixth physical address PA6. The log register 1211*d* stores the processing time point of the third data DT3.

In a second operation ②, the SPO event may occur. The SPO event may indicate unintended interruption of a power supply. For example, the supply of the power supply voltage from the host device 1100 to the PMIC 1215 may be suddenly interrupted. The SPO event may occur while processing the secure delete operation. For example, the SPO event may occur after processing the third data DT3 and before processing the fourth data DT4. The log register 1211*d* may not store the processing time point of the fourth data DT4.

In a third operation ③, a power supply voltage is again supplied after the SPO event occurs. For example, after a time passes from the point in time when the SPO event occurs, the host device 1100 may supply the power supply voltage to the PMIC 1215. The PMIC 1215 may supply a voltage necessary for the security manager 1211, based on the power supply voltage.

In a fourth operation ④, the security manager 1211 detects the occurrence of the SPO event based on the voltage received from the PMIC 1215. The security manager 1211 may refer to the log register 1211*d* for the purpose of checking whether the SPO event occurs during the secure delete operation or whether the SPO event occurs after the secure delete operation. The security manager 1211 may determine that the SPO event occurs during the secure delete operation, with reference to the log register 1211*d*. For example, with reference to the log register 1211*d*, the security manager 1211 may check that the third data DT3 are completely processed and that the fourth data DT4 are not processed. The security manager 1211 resumes an operation for re-encrypting the fourth data DT4. The command manager 1211*a* loads the fourth data DT4 of the first data block PBK1 to the buffer memory 1214*a*.

In a fifth operation ⑤, the key manager 1211*b* provides the first encryption key EK1 to the encryption manager 1211*c* under control of the command manager 1211*a*. For example, under the control of the command manager 1211*a*, the encryption manager 1211*c* may decrypt the fourth data DT4 loaded to the buffer memory 1214*a* by using the first encryption key EK1.

In a sixth operation ⑥, the key manager 1211*b* provides the second encryption key EK2 to the encryption manager 1211*c* under control of the command manager 1211*a*. Under control of the command manager 1211*a*, the encryption manager 1211*c* may encrypt the decrypted fourth data DT4 of the buffer memory 1214*a* using the second encryption key EK2 (e.g., may re-encrypt the decrypted fourth data DT4 by using a new key).

In a seventh operation ⑦, the command manager 1211*a* stores the fourth data DT4 of the buffer memory 1214*a*, which are re-encrypted by using the second encryption key EK2, at the seventh page of the second data block PBK2. The seventh page may be identified by the seventh physical address PA7.

In an eighth operation ⑧, the key manager 1211*b* deletes the first encryption key EK1 under control of the command manager 1211*a*.

As described above, according to embodiments of the present disclosure, even though the SPO event occurs during the secure delete operation, the electronic device 1000 may resume the secure delete operation. The operation of resuming the secure delete operation due to the occurrence of the SPO event may be implemented on the flash translation layer (FTL) in the form of hardware. During the resumed secure delete operation, the electronic device 1000 may identify data corresponding to a suspended operation with reference to a log register, may decrypt the data by using an old key, may re-encrypt the decrypted data by using a new key, and may delete the old key after all the valid data are completely re-encrypted. Accordingly, even though the SPO event occurs during the secure delete operation, the validity of the secure delete operation may be guaranteed.

Figure 12:
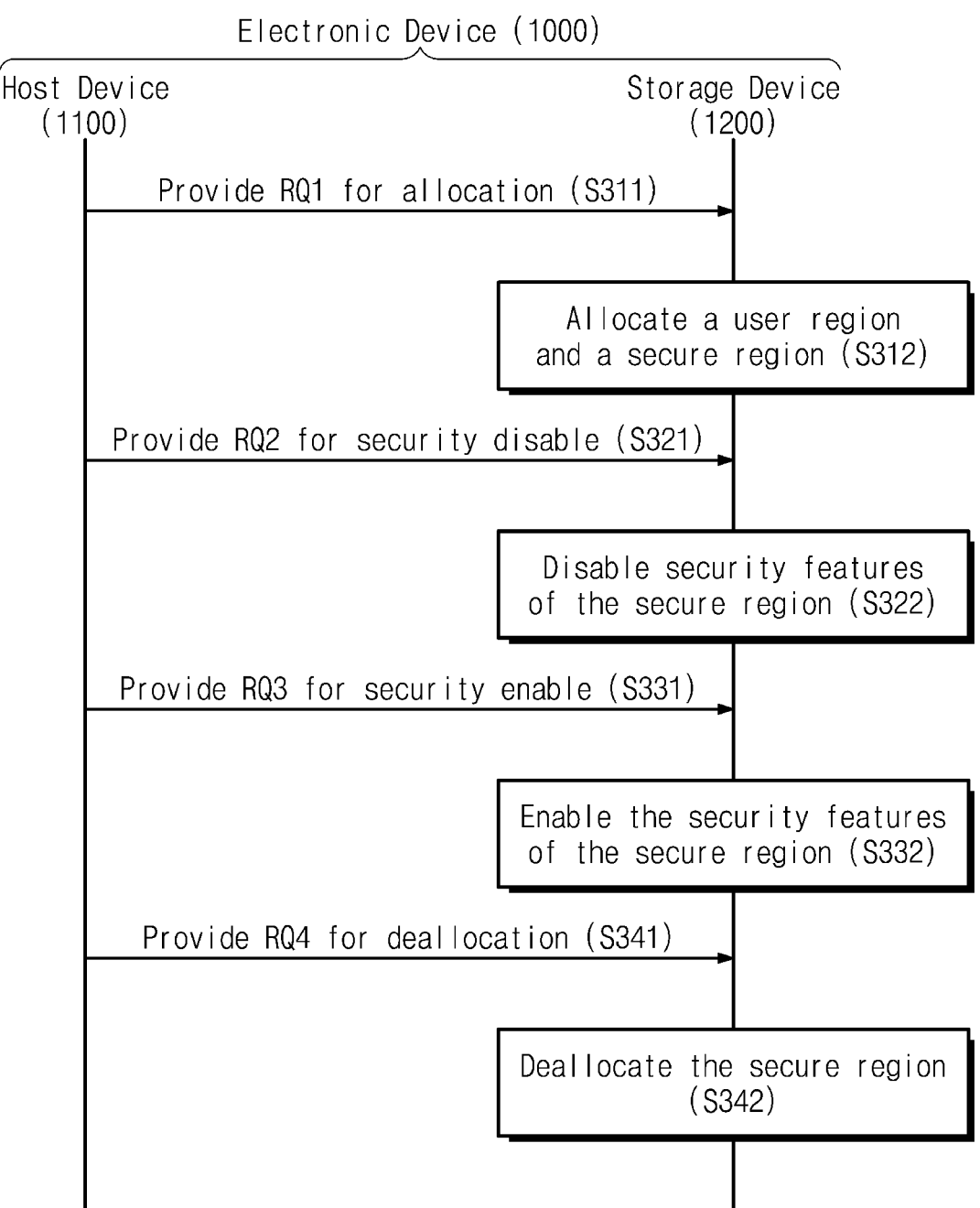
FIG. 12 is a flowchart describing a secure region managing method of an electronic device according to some embodiments of the present disclosure.

FIG. 12 is a flowchart describing a secure region managing method of an electronic device according to some embodiments of the present disclosure. Referring to FIG. 12, the electronic device 1000 includes the host device 1100 and the storage device 1200.

In operation S311, the host device 1100 provides a first request RQ1 for allocation of a user region and a secure region to the storage device 1200.

In operation S312, the storage device 1200 allocates the user region and the secure region. The secure region may store encrypted data. The user region may store unencrypted data or data encrypted in compliance with a policy different from the security policy of the present disclosure.

In operation S321, the host device 1100 provides a second request RQ2 for security disable of the secure region.

In operation S322, the storage device 1200 disables security features of the secure region. When the security features are disabled, the address range of the allocated secure region may be maintained without modification. Until the security features are again enabled, the secure region may operate to be similar to the user region.

For example, when the write request is received from the host device 1100, the storage device 1200 stores unencrypted data in the secure region. When the delete request is received from the host device 1100, the storage controller 1200 may perform un-mapping of invalid data of the secure region without performing a rewrite operation of valid data. In contrast, when the read request for data stored while the security features are enabled is received from the host device 1100, the storage controller 1200 decrypts the encrypted data of the secure region and provides the decrypted data to the host device 1100.

In operation S331, the host device 1100 provides a third request RQ3 for security enable of the secure region.

In operation S332, the storage device 1200 enables the security features of the secure region. When the security features are enabled, the secure region may support the secure operation for next read, write, and delete. Through the background operation, the storage device 1200 may encrypt data stored while the security features are disabled and may store the encrypted data in the secure region.

In operation S341, the host device 1100 provides a fourth request RQ4 for deallocation of the secure region.

In operation S342, the storage device 1200 deallocates the secure region. For example, in at least on embodiment, the deallocated secure region may be maintained as an empty partition and/or may be included in the user region.

In some embodiments, depending on a deallocation mode of the fourth request RQ4, the storage device 1200 may physically erase all the data of the secure region and/or may decrypt all the data of the secure region so as to be stored in the user region.

Figure 13:
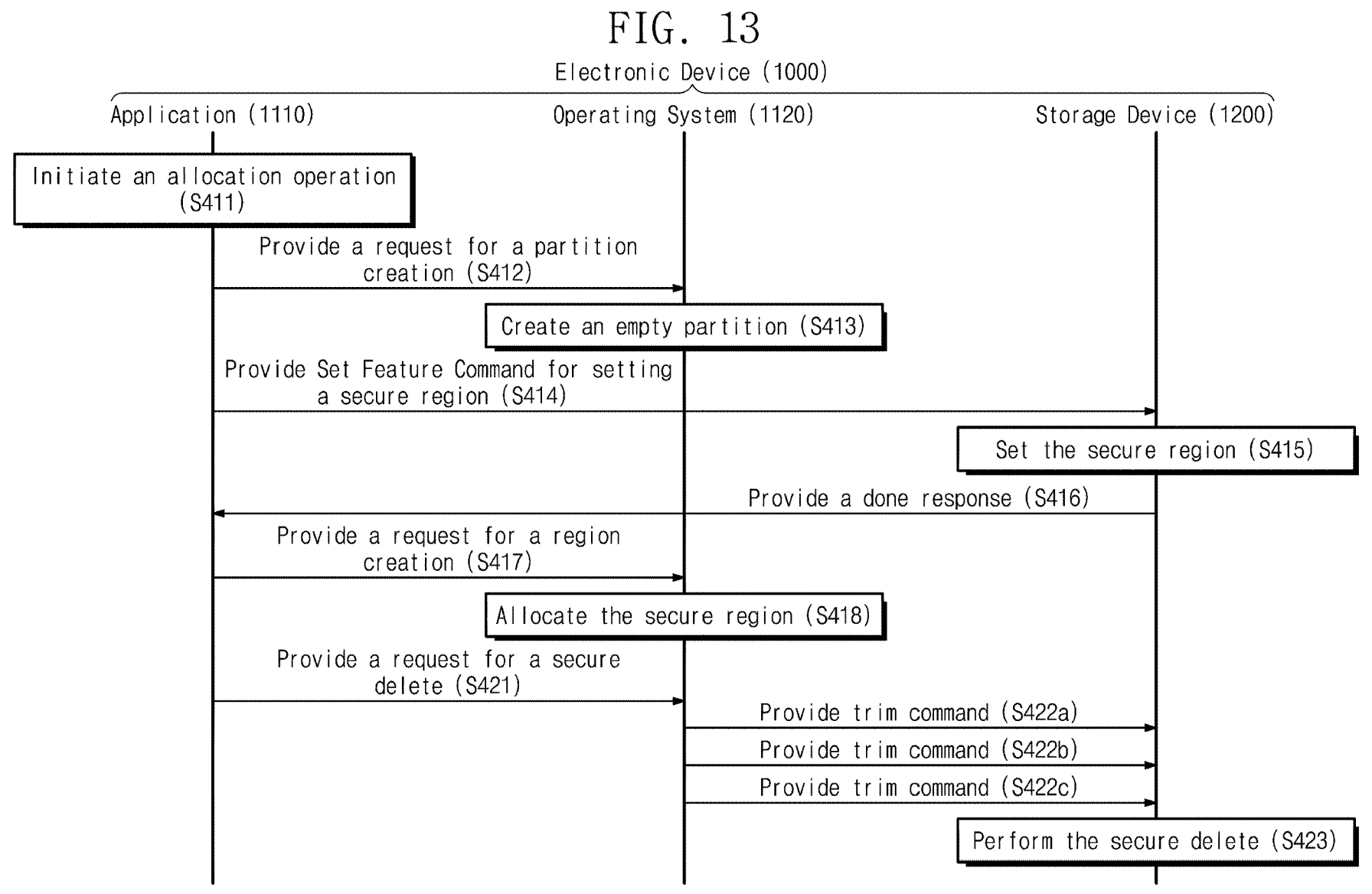

FIG. 13 is a flowchart describing a method of operating an electronic device according to some embodiments of the present disclosure. Referring to FIG. 13, the electronic device 1000 includes the application 1110, the operating system 1120, and the storage device 1200. The electronic device 1000 may operate in compliance with the NVMe standard.

In operation S411, the application 1110 initiates the allocation operation under control of the user.

In operation S412, the application 1110 provides the operating system 1120 for a request for partition creation.

In operation S413, the operating system 1120 creates an empty partition. For example, the operating system 1120 may shrink a previously allocated user region and may create the empty partition corresponding to the shrunk address range.

In operation S414, the application 1110 provides the storage device 1200 with a set feature command for setting a secure region. The set feature command may be defined, for example, in the NVMe standard. A feature identifier of the set feature command may indicate an operation of generating the secure region. The feature identifier of the set feature command may be referred to as "CreateSecurePartition". The set feature command may include an address range (e.g., an LBA range) corresponding to the secure region.

In operation S415, the storage device 1200 sets the secure region based on the set feature command. For example, the storage device 1200 may store the address range of the secure region. The storage device 1200 may create an encryption key for the secure operation.

In operation S416, the storage device 1200 provides a done response to the application 1110.

In operation S417, the application 1110 provides the operating system 1120 for a request for region creation.

In operation S418, the operating system 1120 allocates the secure region.

In operation S421, the application 1110 provides the operating system 1120 for a request for the secure delete operation. For example, instead of immediately executing the secure delete operation, the application 1110 may allow the operating system 1120 to schedule the timing to execute the secure delete operation. In at least one embodiment, the secure delete operation may be executed through the background operation of the operating system 1120. The operating system 1120 may generate at least one trim command, based on the request of the application 1110. The trim command may be used to delete (e.g., un-map) a mapping relationship of a data chunk in units of logical address.

In operation S422a, operation S422b, and operation S422c, the operating system 1120 may provide the storage device 1200 with a plurality of trim commands sequentially based on the scheduled timing. For example, the operating system 1120 may trigger a request for secure delete to the storage device 1200.

Three trim commands are illustrated in FIG. 13 for intuitive understanding of the trim command, but the present disclosure is not limited thereto. The number of trim commands may increase or decrease depending on the number of data chunks to be invalidated in the secure delete operation.

In operation S423, the storage device 1200 performs the secure delete operation. For example, based on the trim commands in operation S422a, operation S422b, and operation S422c, the storage device 1200 may identify valid data, may re-encrypt the valid data by using a new key, may store the re-encrypted data in any other data block, and may delete an old key.

FIG. 14 is a flowchart describing a method of operating an electronic device according to some embodiments of the present disclosure. Referring to FIG. 14, the electronic device 1000 may include the application 1110, the operating system 1120, and the storage device 1200. The electronic device 1000 may operate in compliance with the NVMe standard. Operation S511, operation S512, operation S513, operation S514, operation S515, operation S516, operation S517, and operation S518 are the same as and/or substantially similar to operation S411, operation S412, operation S413, operation S414, operation S415, operation S416, operation S417, and operation S418 of FIG. 13, and thus, additional description will be omitted to avoid redundancy.

In operation S521, the application 1110 provides the storage device 1200 with a set feature command for the secure delete operation. Instead of performing the secure delete operation through the background operation of the operating system 1120, the application 1110 may directly control the storage device 1200 such that the secure delete operation is immediately performed. For example, the application 1110 may trigger a request for secure delete to the storage device 1200.

A feature identifier of the set feature command may indicate an operation for safely deleting invalid data of the secure region (e.g., an operation of re-encrypting valid data by using a new key and deleting an old key). The feature identifier of the set feature command may be referred to as "TriggerSecureMigration". The set feature command may include an address range (e.g., an LBA range) corresponding to the secure region.

In operation S522, the storage device 1200 performs the secure delete operation. For example, based on the set feature command in operation 521, the storage device 1200 identifies valid data, re-encrypts the valid data by using a new key, stores the re-encrypted data in any other data block, and deletes an old key.

FIG. 15 is a diagram describing a command of an electronic device according to some embodiments of the present disclosure. An example of the set feature command of FIGS. 13 and 14 will be described with reference to FIG. 15.

The set feature command may include 32 binary bits.

Bits 00 to 07 of the set feature command may belong to a field for storing a feature identifier. The field may indicate an identifier designated by the set feature command. An operation of the set feature command may be specified depending on the feature identifier.

Bits 08 to 30 of the set feature command may belong to a reserved field.

Bit 31 of the set feature command may belong to a save field. The save field may specify that the storage controller shall save the attribute, so that the attribute persists through all power states and resets.

Because the bits 00 to 07 of the set feature command corresponding to the feature identifier are 8 binary bits, they may be represented again with 2 hexadecimal bits. Referring to a table of the feature identifier, the content of the feature identifier according to two hexadecimal bit values are described.

A bit 00$h$ of the feature identifier may belong to a reserved field.

Bits 01$h$ to 18$h$ of the feature identifier may be defined in the NVMe standard.

Bits 19$h$ to 77$h$ of the feature identifier may belong to a reserved field.

Bits 78$h$ to 7Fh of the feature identifier may represent operations defined in the NVMe management interface standard.

Bits 80$h$ to BFh of the feature identifier may belong to a reserved field and may indicate a specified command set.

Bits C0$h$ to FFh of the feature identifier may belong to a vendor specific field. The feature identifier "CreateSecurePartition" and the feature identifier "TriggerSecureMigration" described with reference to FIGS. 13 and 14 may be implemented by using some of bits of a vendor specific field.

Figure 16:
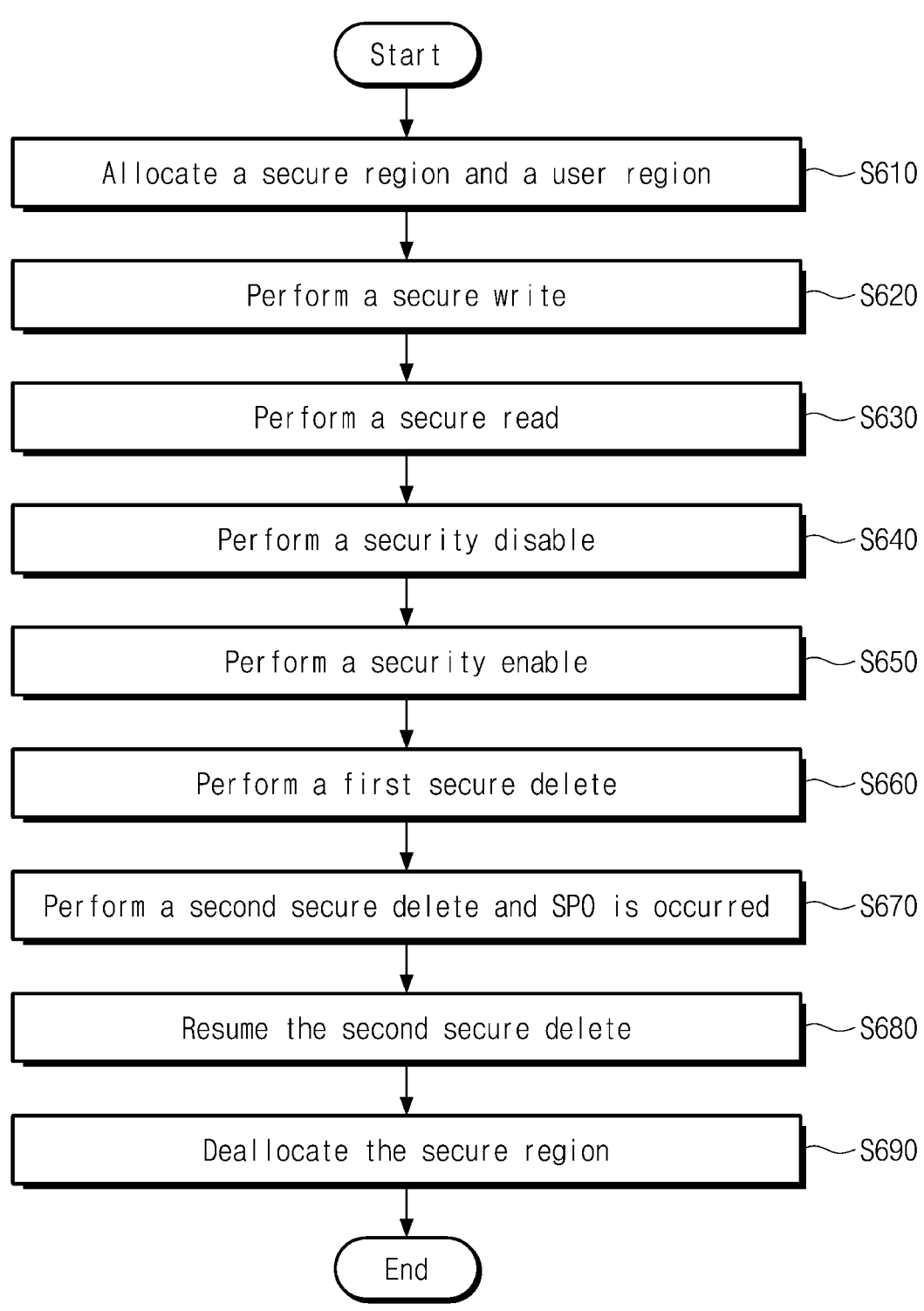
FIG. 16 is a flowchart describing a method of operating an electronic device according to some embodiments of the present disclosure.

FIG. 16 is a flowchart describing a method of operating an electronic device according to some embodiments of the present disclosure. A method of operating an electronic device will be described with reference to FIG. 16. An electronic device may include a host device and a storage device, e.g., the host device 1100 and the storage device 1200.

In operation S610, the electronic device allocates a secure region and a user region. For example, depending on a request of the host device, some of physical data blocks of a non-volatile memory device in the storage device may be used as the secure region, and the others thereof may be used as the user region.

In operation S620, the electronic device performs a secure write operation. For example, the host device may issue a request for the secure write operation. The storage device may encrypt data by using an encryption key and may store the encrypted data in the secure region.

In operation S630, the electronic device performs a secure read operation. For example, the host device may issue a request for the secure read operation. The storage device may load the encrypted data of the secure region, may decrypt the loaded data by using the encryption key, and may provide the decrypted data to the host device.

In operation S640, the electronic device performs security disable. For example, the host device may issue a request for security disable. The storage device may disable security features of the secure region.

In operation S650, the electronic device performs security enable. For example, the host device may issue a request for security enable. The storage device may enable the security features of the secure region.

In operation S660, the electronic device performs a first secure delete operation. For example, a first data block of the secure region may include first to fourth data encrypted by using a first encryption key. The host device may issue a request for the first secure delete operation of the first data. The storage device may load the second to fourth data of the first data block, may decrypt the second to fourth data by using the first encryption key, may re-encrypt the second to fourth data by using a second encryption key, and may store the re-encrypted second to fourth data in a second data block of the secure region.

In operation S670, the electronic device performs a second secure delete operation. The SPO event may occur while performing the second secure delete operation. The electronic device may detect the SPO event occurring while performing the second secure delete operation.

For example, the first data block of the secure region may include the second to fourth data encrypted by using the second encryption key. The host device may issue a request for the second secure delete operation of the second data. As such, the storage device may load the third data of the second data block, may decrypt the third data by using the second encryption key, may re-encrypt the third data by using a third encryption key, and may store the re-encrypted third data in a third data block of the secure region. The SPO event may occur after the third data are completely processed and before the fourth data are processed. The re-encryption operation of the fourth data may be suspended due to the SPO event.

In operation S680, the electronic device resumes the second secure delete operation. For example, after the electronic device detects the SPO event occurring during the second secure delete operation, the host device may again supply the power supply voltage to the storage device. The storage device may refer to a log register based on the power supply voltage again supplied and may check that the processing of the third data is completed but the processing of the fourth data is not completed. Then, the storage device may load the fourth data of the second data block, may decrypt the fourth data by using the second encryption key, may re-encrypt the fourth data by using the third encryption key, and may store the re-encrypted fourth data in the third data block of the secure region. That is, when the secure delete operation is resumed, the storage device may use an old key for decryption and may use a new key for re-encryption.

In operation S690, the electronic device deallocates the secure region. For example, the host device may issue a request for deallocation of the secure region. The storage device may deallocate the secure region. The deallocated secure region may be maintained as an empty partition or may be included in the user region.

According to at least one embodiment of the present disclosure, a storage device deleting an encryption key, a method of operating the same, and a method of operating an electronic device including the storage device are provided.

Also, a storage device which deletes an encryption key such that it is guaranteed that un-mapped data is unrecoverable, selectively uses a secure region or a user region such that convenience is improved, guarantees validity of a secure delete operation even though a sudden power off (SPO) event occurs, a method of operating the same, and a method of operating an electronic device including the storage device are provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A method of operating a storage device which communicates with a host device, the method comprising:

allocating a secure region and a user region in the storage device;

storing first data encrypted by using a first encryption key in a first data block of the secure region;

decrypting at least one valid data of the first data block using the first encryption key in response to receiving a first request from the host device, wherein the first request indicates a first secure delete operation of the first data and the at least one valid data does not include the first data;

encrypting the decrypted at least one valid data using a second encryption key, wherein the second encryption key is different from the first encryption key;

storing the encrypted at least one valid data in a second data block of the secure region; and deleting the first encryption key, wherein the first request includes a first set feature command of a non-volatile memory express (NVMe) standard, and the first set feature command includes a feature identifier indicating the first secure delete operation and an address range corresponding to the secure region.

2. The method of claim 1, further comprising:

storing second data in a user data block of the user region in response to receiving a second request from the host device, wherein the second request indicates a non-secure write operation of the second data and the second data is not encrypted.

3. The method of claim 1, wherein the first data has a chunk size, and the chunk size corresponds to a size of a logical block address (LBA) of the host device and is smaller than a unit of a physical erase operation of the storage device.

4. The method of claim 1, wherein the allocating of the secure region and the user region includes:

receiving a first command indicating setting of the secure region;

storing the address range based on the first command;

creating the first encryption key based on the first command; and providing the host device with a response indicating that the setting of the secure region is done.

5. The method of claim 4, wherein the first command is a second set feature command of the NVMe standard, and the second set feature command includes a feature identifier indicating the setting of the secure region and the address range.

6. The method of claim 1, wherein the first request is triggered by an operating system of the host device, and the first request includes a trim command for deleting a mapping relationship of the first data in a mapping table of the storage device.

7. The method of claim 1, wherein the first request is triggered by an application of the host device.

8. The method of claim 1, further comprising:

receiving, from the host device, a third request indicating a second secure delete operation of third data among the encrypted at least one valid data of the second data block;

detecting a sudden power off (SPO) event while performing the second secure delete operation based on the third request; and resuming the second secure delete operation after detecting the SPO event in response to a power supply voltage being supplied from the host device.

9. The method of claim 8, wherein the detecting of the SPO event includes storing a start time point of the second secure delete operation in a log register in response to the third request, and the resuming the second secure delete operation includes determining, in response to the power supply voltage, that the SPO event occurred while performing the second secure delete operation, with reference to the log register, and resuming the second secure delete operation in response to the determination that the SPO event occurred while performing the second secure delete operation.

10. The method of claim 8, wherein the encrypted at least one valid data of the second data block include fourth data, and the fourth data is valid data in the second secure delete operation, and wherein the resuming of the second secure delete operation includes decrypting the fourth data of the second data block using the second encryption key, based on the third request and the supply of the power supply voltage, encrypting the fourth data using a third encryption key, wherein the third encryption key is different from the second encryption key, storing the encrypted fourth data in a third data block of the secure region, and deleting the second encryption key.

11. The method of claim 1, wherein the storing of the first data encrypted using the first encryption key includes receiving, from the host device, a fourth request indicating a secure write operation of the first data, receiving the first data from the host device, encrypting, based on the fourth request, the received first data using the first encryption key; and storing the encrypted first data in the first data block of the secure region.

12. The method of claim 1, further comprising:

loading the encrypted first data of the first data block in response to receiving a fifth request after the storing the encrypted first data and before the deleting the first encryption key, wherein the fifth request indicates a secure read operation of the first data from the host;

decrypting the loaded encrypted first data using the first encryption key; and providing the decrypted first data to the host device.

13. The method of claim 1, further comprising:

disabling security features of the secure region based on a sixth request from the host device, the sixth request indicating a security disablement of the secure region; and enabling, after the disabling the security features, the security features of the secure region in response to receiving a seventh request, the seventh request indicating a security enablement of the secure region.

14. The method of claim 1, further comprising:

deallocating the secure region in response to receiving an eighth request from the host device, the eighth request indicating a deallocation of the secure region.

15. A method of operating an electronic device which includes a host device and a storage device, the method comprising:

providing, by the host device, a first request for allocation of the storage device;

allocating, by the storage device, a secure region and a user region in response to the first request;

providing, by the host device, a second request for a secure write operation of target data;

storing, by the storage device, first data encrypted by using a first encryption key in a first data block of the secure region in response to the second request;

providing, by the host device, a third request indicating a secure delete operation of the target data;

decrypting, by the storage device, at least one valid data of the first data block using the first encryption key in response to the third request, wherein the at least one valid data does not include the target data;

encrypting, by the storage device, the decrypted at least one valid data using a second encryption key different from the first encryption key;

storing, by the storage device, the encrypted at least one valid data in a second data block of the secure region; and deleting, by the storage device, the first encryption key, wherein the third request includes a set feature command of a non-volatile memory express (NVMe) standard, and the set feature command includes a feature identifier indicating the secure delete operation and an address range corresponding to the secure region.

16. The method of claim 15, wherein the third request is triggered by an application or an operating system of the host device.

17. A storage device comprising:

a non-volatile memory device including a user region and a secure region; and a storage controller configured to communicate with a host device and the non-volatile memory device, wherein the storage controller is configured to store target data encrypted using a first encryption key in a first data block of the secure region in response to receiving a first request from the host device, wherein the first request indicates a secure write operation;

decrypt at least one valid data of the first data block using the first encryption key in response to receiving a second request from the host device, wherein the second request indicates a secure delete operation and the at least one valid data does not include first data;

encrypt the decrypted at least one valid data using a second encryption key, wherein the second encryption key is different from the first encryption key;

store the encrypted at least one valid data in a second data block of the secure region; and delete the first encryption key, wherein the second request includes a set feature command of a non-volatile memory express (NVMe) standard, and the set feature command includes a feature identifier indicating the secure delete operation and an address range corresponding to the secure region.

18. The storage device of claim 17, wherein the storage controller includes a buffer memory configured to buffer the target data and the at least one valid data, a mapping table configured to manage a mapping relationship between a logical address and a physical address of the target data, and processing circuitry configured to process the first request and the second request based on communicating with the host device, the buffer memory, and the mapping table.

19. The storage device of claim 18, wherein the processing circuitry includes:

a command manager configured to process the first request and the second request;

an encryption manager configured to, under control of the command manager, encrypt the target data by using the first encryption key, to decrypt the at least one valid data by using the first encryption key, and to encrypt the decrypted at least one valid data by using the second encryption key;

a key manager configured to provide the first encryption key and the second encryption key to the encryption manager under control of the command manager; and a log register configured to store logs of the secure delete operation of the second request under control of the command manager.

\*   \*   \*   \*   \*